United States Patent
Vantomme et al.

(10) Patent No.: US 10,336,892 B2
(45) Date of Patent: Jul. 2, 2019

(54) METALLOCENE CATALYZED POLYETHYLENE RESIN

(71) Applicant: Total Research & Technology Feluy, Seneffe (Feluy) (BE)

(72) Inventors: Aurélien Vantomme, Mignault (BE); Eric Maziers, Seneffe (BE); Christopher Willocq, Bousval (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 20 days.

(21) Appl. No.: 15/525,675

(22) PCT Filed: Nov. 10, 2015

(86) PCT No.: PCT/EP2015/076252
§ 371 (c)(1),
(2) Date: May 10, 2017

(87) PCT Pub. No.: WO2016/075163
PCT Pub. Date: May 19, 2016

(65) Prior Publication Data
US 2017/0321047 A1    Nov. 9, 2017

(30) Foreign Application Priority Data
Nov. 13, 2014   (EP) .................................... 14193018

(51) Int. Cl.
| | | |
|---|---|---|
| C08L 23/08 | (2006.01) | |
| C08F 4/6592 | (2006.01) | |
| C08F 4/653 | (2006.01) | |
| C08F 10/02 | (2006.01) | |
| C08L 23/06 | (2006.01) | |
| C08F 4/659 | (2006.01) | |

(52) U.S. Cl.
CPC .......... *C08L 23/0815* (2013.01); *C08F 10/02* (2013.01); *C08L 23/06* (2013.01); *C08L 23/08* (2013.01); *C08F 4/65904* (2013.01); *C08F 4/65912* (2013.01); *C08F 4/65916* (2013.01); *C08L 2205/02* (2013.01); *C08L 2314/06* (2013.01)

(58) Field of Classification Search
CPC .............. C08L 23/8015; C08F 4/65927; C08F 210/16; C08F 4/65904
See application file for complete search history.

(56) References Cited

U.S. PATENT DOCUMENTS

| | | |
|---|---|---|
| 6,372,864 B1 | 4/2002 | Brown |
| 7,022,770 B2 † | 4/2006 | Lustiger |
| 2005/0017409 A1 | 1/2005 | Weber et al. |
| 2005/0256266 A1 | 11/2005 | Lustiger et al. |
| 2005/0256271 A1 | 11/2005 | Lustiger et al. |

FOREIGN PATENT DOCUMENTS

| | | |
|---|---|---|
| WO | 2011025742 A1 | 3/2011 |
| WO | 2014016318 A1 | 1/2014 |

OTHER PUBLICATIONS

International Search Report issued in PCT/EP2015/076252, dated Feb. 24, 2016, 4 pages.
ASTM D1505, Standard Test Method for Density of Plastics by the Density-Gradient Technique. (2010).†
Monrabal et al., Crystallization Elution Fractionation and Thermal Gradient Interaction Chromatography. Techniques Comparison, Macromolecular Symposia, vol. 312, pp. 115-129, (2012).†
Monrabal, et al., Advances in Crystallization Elution Fractionation, Macromolecular Symposia., vol. 282, pp. 14-24 (2009).†

† cited by third party

*Primary Examiner* — Caixia Lu
(74) *Attorney, Agent, or Firm* — Albert Shung

(57) ABSTRACT

The present invention relates to a metallocene-catalyzed polyethylene resin comprising at least two metallocene-catalyzed polyethylene fractions A and B, wherein the polyethylene resin comprises:
at least 25% to at most 55% by weight of polyethylene fraction A based on the total weight of the polyethylene resin, wherein fraction A has a density at least 0.005 g/cm³ higher than the density of the polyethylene resin; and a melt index MI2 of at least 25.0 g/10 min as determined according to ISO 1133, condition D, at 190° C. and under a load of 2.16 kg; and
wherein the polyethylene resin has a density of at least 0.938 g/cm³ to at most 0.954 g/cm³ as measured according to ASTM D-1505 at 23° C.; a melt index MI2 of at least 2.5 g/10 min to at most 25.0 g/10 min as determined according to ISO 1133, condition D, at 190° C. and under a load of 2.16 kg and a molecular weight distribution $M_w/M_n$ of at least 2.6 to at most 4.2, with $M_w$ being the weight-average molecular weight and $M_n$ being the number-average molecular weight.

The present invention also relates to an article comprising said resin.

14 Claims, 6 Drawing Sheets

METALLOCENE CATALYZED POLYETHYLENE RESIN

FIELD OF THE INVENTION

The present invention relates to a metallocene catalyzed polyethylene resin, and to articles comprising said metallocene catalyzed polyethylene resin

BACKGROUND OF THE INVENTION

Polyethylene has been used in the production of various products, such as tanks and packaging. Examples of such products include bottles, drums, containers, and the like.

Polyethylene drums and tanks can easily be manufactured by rotomolding. Often these drums and tanks are exposed to numerous stresses during their lifetime, and that exposure may result in cracks or breaks.

Tailoring the properties of polyolefins, such as polyethylene, to fit a desired applicability is therefore constantly ongoing. In this case particularly, the objective is to develop polyethylene resin that imparts high rigidity and/or high environmental stress crack resistance to articles made therefrom, in particular rotomolded articles.

SUMMARY OF THE INVENTION

According to a first aspect, the present invention provides a metallocene-catalyzed polyethylene resin comprising at least two metallocene-catalyzed polyethylene fractions A and B, wherein the polyethylene resin comprises:

at least 25% to at most 55% by weight of polyethylene fraction A based on the total weight of the polyethylene resin, wherein fraction A has a density at least 0.005 g/cm$^3$ higher than the density of the polyethylene resin; and wherein the polyethylene resin has a density of at least 0.938 g/cm$^3$ to at most 0.954 g/cm$^3$ as measured according to ASTM D-1505 at 23° C.; a melt index MI2 of at least 2.5 g/10 min to at most 25.0 g/10 min as determined according to ISO 1133, condition D, at 190° C. and under a load of 2.16 kg, and a molecular weight distribution $M_w/M_n$ of at least 2.6 to at most 4.2, with $M_w$ being the weight-average molecular weight and $M_n$ being the number-average molecular weight.

Preferably, the metallocene-catalyzed polyethylene resin comprises at least two metallocene-catalyzed polyethylene fractions A and B, wherein the polyethylene resin comprises:

at least 25% to at most 55% by weight of polyethylene fraction A based on the total weight of the polyethylene resin, wherein fraction A has a melt index MI2 of at least 25.0 g/10 min as determined according to ISO 1133, condition D, at 190° C. and under a load of 2.16 kg, and a density at least 0.005 g/cm$^3$ higher than the density of the polyethylene resin; and wherein the polyethylene resin has a density of at least 0.938 g/cm$^3$ to at most 0.950 g/cm$^3$ as measured according to ASTM D-1505 at 23° C.; a melt index MI2 of at least 2.5 g/10 min to at most 25.0 g/10 min as determined according to ISO 1133, condition D, at 190° C. and under a load of 2.16 kg, and a molecular weight distribution $M_w/M_n$ of at least 2.6 to at most 4.2, with $M_w$ being the weight-average molecular weight and $M_n$ being the number-average molecular weight.

According to a second aspect, the present invention provides an article comprising the metallocene-catalyzed polyethylene resin according to the first aspect of the present invention.

The independent and dependent claims set out particular and preferred features of the invention. Features from the dependent claims may be combined with features of the independent or other dependent claims as appropriate.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF THE INVENTION

Figure 1:
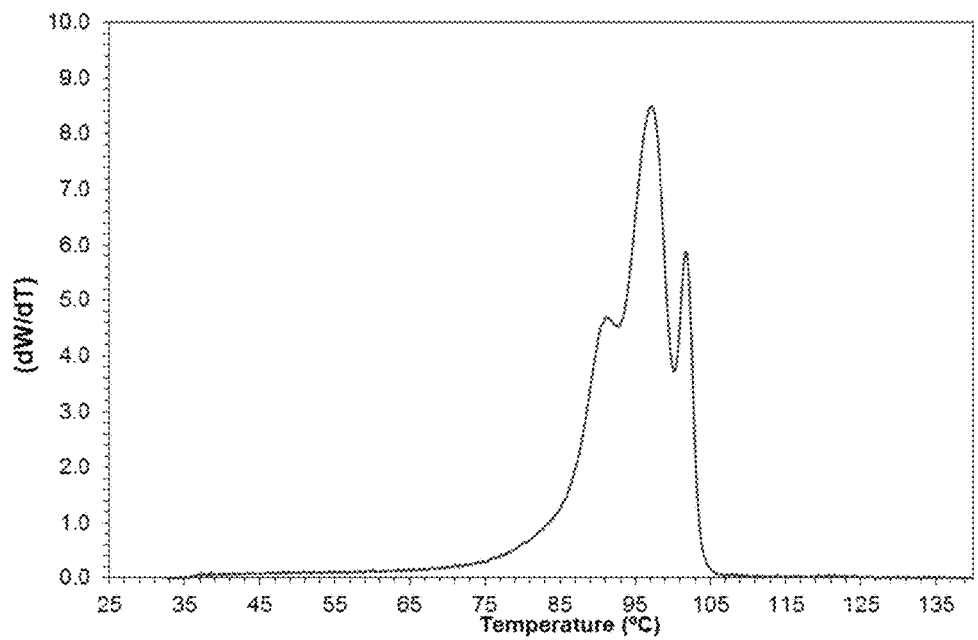
FIG. 1 represents a graph plotting a TREF (temperature rising elution fractionation) profile (dW/dT (%/° C.)) as a function of temperature for polyethylene resin 1 according to an embodiment of the present invention.

When describing the invention, the terms used are to be construed in accordance with the following definitions, unless a context dictates otherwise.

As used herein, the singular forms "a", "an", and "the" include both singular and plural referents unless the context clearly dictates otherwise. By way of example, "a resin" means one resin or more than one resin.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

All references cited in the present specification are hereby incorporated by reference in their entirety. In particular, the teachings of all references herein specifically referred to are incorporated by reference.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Preferred statements (features) and embodiments of the articles, resins and uses of this invention are set herein below. Each statements and embodiments of the invention so defined may be combined with any other statement and/or embodiments unless clearly indicated to the contrary. In particular, any feature indicated as being preferred or advantageous may be combined with any other feature or features or statements indicated as being preferred or advantageous. Hereto, the present invention is in particular captured by any one or any combination of one or more of the below numbered aspects and embodiments 1 to 29, with any other statement and/or embodiments.

1. A metallocene-catalyzed polyethylene resin comprising at least two metallocene-catalyzed polyethylene fractions A and B, wherein the metallocene-catalyzed polyethylene resin comprises:
   at least 25% to at most 55% by weight of polyethylene fraction A based on the total weight of the polyethylene resin, wherein fraction A has a density at least 0.005 g/cm$^3$ higher than the density of the polyethylene resin; and
   wherein the metallocene-catalyzed polyethylene resin has a density of at least 0.938 g/cm$^3$ to at most 0.954 g/cm$^3$ as measured according to ASTM D-1505 at 23° C.; a melt index MI2 of at least 2.5 g/10 min to at most 25.0 g/10 min as determined according to ISO 1133, condition D, at 190° C. and under a load of 2.16 kg; wherein the polyethylene resin has a molecular weight distribution $M_w/M_n$ of at least 2.6 to at most 4.2, preferably of at least 2.6 to at most 4.0, preferably of at least 2.7 to at most 3.9, preferably of at least 2.9 to at most 3.8, preferably of at least 3.0 to at most 3.6, with $M_w$ being the weight-average molecular weight and $M_n$ being the number-average molecular weight.

2. A metallocene-catalyzed polyethylene resin comprising at least two metallocene-catalyzed polyethylene fractions A and B, wherein the metallocene-catalyzed polyethylene resin comprises:
   at least 45% to at most 75% by weight of polyethylene fraction B based on the total weight of the polyethylene resin, wherein fraction B has a density at least 0.005 g/cm$^3$ lower than the density of the polyethylene resin; and
   wherein the metallocene-catalyzed polyethylene resin has a density of at least 0.938 g/cm$^3$ to at most 0.954 g/cm$^3$ as measured according to ASTM D-1505 at 23° C.; a melt index MI2 of at least 2.5 g/10 min to at most 25.0 g/10 min as determined according to ISO 1133, condition D, at 190° C. and under a load of 2.16 kg, and a molecular weight distribution $M_w/M_n$ of at least 2.6 to at most 4.2, preferably of at least 2.6 to at most 4.0, preferably of at least 2.7 to at most 3.9, preferably of at least 2.9 to at most 3.8, preferably of at least 3.0 to at most 3.6, with $M_w$ being the weight-average molecular weight and $M_n$ being the number-average molecular weight.

3. A metallocene-catalyzed polyethylene resin comprising at least two metallocene-catalyzed polyethylene fractions A and B, wherein the polyethylene resin comprises:
   at least 25% to at most 55% by weight of polyethylene fraction A based on the total weight of the polyethylene resin, wherein fraction A has a melt index MI2 of at least 25.0 g/10 min as determined according to ISO 1133, condition D, at 190° C. and under a load of 2.16 kg, and a density at least 0.005 g/cm$^3$ higher than the density of the polyethylene resin; and
   wherein the polyethylene resin has a density of at least 0.938 g/cm$^3$ to at most 0.950 g/cm$^3$ as measured according to ASTM D-1505 at 23° C.; a melt index MI2 of at least 2.5 g/10 min to at most 25.0 g/10 min as determined according to ISO 1133, condition D, at 190° C. and under a load of 2.16 kg, and a molecular weight distribution Mw/Mn of at least 2.6 to at most 4.2, with Mw being the weight-average molecular weight and Mn being the number-average molecular weight.

4. A metallocene-catalyzed polyethylene resin comprising at least two metallocene-catalyzed polyethylene fractions A and B, wherein the polyethylene resin comprises:

at least 25% to at most 55% by weight of polyethylene fraction A based on the total weight of the polyethylene resin, wherein fraction A has a density at least 0.005 g/cm³ higher than the density of the polyethylene resin;

wherein the polyethylene resin has a density of at least 0.938 g/cm³ to at most 0.950 g/cm³ as measured according to ASTM D-1505 at 23° C.; a melt index MI2 of at least 2.5 g/10 min to at most 25.0 g/10 min as determined according to ISO 1133, condition D, at 190° C. and under a load of 2.16 kg, and a molecular weight distribution Mw/Mn of at least 2.6 to at most 4.2, with Mw being the weight-average molecular weight and Mn being the number-average molecular weight; and wherein each fraction is prepared in different reactors of at least two reactors connected in series.

5. The metallocene-catalyzed polyethylene resin according to any one of statements 1 to 4, wherein the Temperature Rising Elution Fractionation (TREF) distribution curve of said resin comprises at least one peak appearing at a temperature of at least 97° C. to at most 105° C. and having an area under the curve of at least 5.0% to at most 25.0%; as determined using a crystallization rate of −0.5° C./min from 95° C. to 35° C., and column load volume of 1.90 ml, preferably as determined using the conditions listed in Table 2.

6. The metallocene-catalyzed polyethylene resin according to statement 5, wherein the Temperature Rising Elution Fractionation (TREF) distribution curve of said resin further comprises two more peaks having the following features:

peak 1 appearing at a temperature of at least 87.0° C. to at most 93.0° C. and having an area under the curve of at least 25.0% to at most 50.0%;

peak 2 appearing at a temperature of at least 94.0° C. to at most 98.0° C. and having an area under the curve of at least 35.0% to at most 60.0%.

7. The metallocene-catalyzed polyethylene resin according to any one of statements 5 or 6, wherein the Temperature Rising Elution Fractionation (TREF) distribution curve of said resin has an area under the curve of at most 5.0% at a temperature of 65° C. or below, preferably at most 4.0%, preferably at most 3.0%.

8. The metallocene-catalyzed polyethylene resin according to any one of statements 5 to 7, wherein at most 5.0% by weight of said metallocene-catalyzed polyethylene resin elutes in TREF at a temperature of 65° C. or below, preferably at most 4.0% by weight, preferably at most 3.0% by weight calculated based on the total weight of crystallisable polyethylene fractions, as determined using a crystallization rate of −0.5° C./min from 95° C. to 35° C., and column load volume of 1.90 ml.

9. The metallocene-catalyzed polyethylene resin according to any one of statements 1 to 8, wherein the at least one metallocene-catalyzed polyethylene resin has an HLMI of at least 85.0 g/10 min, preferably of at least 90.0 g/10 min, preferably of at least 100.0 g/10 min, preferably of at least 105.0 g/10 min, as measured according to ISO 1133:1997 condition G at 190° C. and under a load of 21.6 kg.

10. The metallocene-catalyzed polyethylene resin according to any one of statements 1 to 9, wherein fraction A has a density at least 0.010 g/cm³ higher than the density of the at least one metallocene-catalyzed polyethylene resin, preferably at least 0.015 g/cm³ higher, preferably at least 0.020 g/cm³ higher than the density of the at least one metallocene-catalyzed polyethylene resin.

11. The metallocene-catalyzed polyethylene resin according to any one of statements 1 to 10, wherein polyethylene fraction A has a density as measured on the fluff of at least 0.950 g/cm³, preferably of at least 0.955 g/cm³, preferably of at least 0.958 g/cm³, preferably of at least 0.960 g/cm³.

12. The metallocene-catalyzed polyethylene resin according to any one of statements 1, 2, 4 to 11, wherein polyethylene fraction A has a melt index MI2 as measured on the fluff of at least 15.0 g/10 min, preferably at least 20.0 g/10 min, preferably at least 25.0 g/10 min, preferably at least 30.0 g/10 min, preferably of at least 35.0 g/10 min, preferably of at least 40.0 g/10 min, preferably of at least 45.0 g/10 min.

13. The metallocene-catalyzed polyethylene resin according to any one of statements 1 to 12, comprising from 45.0% to at most 75.0% by weight of polyethylene fraction B based on the total weight of the at least one metallocene-catalyzed polyethylene resin, preferably from 50.0% to at most 75.0% by weight, preferably from 55.0% to at most 70.0% by weight, preferably from 56.0% to at most 65.0% by weight, preferably from 58.0% to at most 60.0% by weight.

14. The metallocene-catalyzed polyethylene resin according to any one of statements 1 to 13, wherein fraction B has a density of at least 0.005 g/cm³ lower than the density of the polyethylene resin, preferably at least 0.010 g/cm³ lower, preferably at least 0.014 g/cm³ lower than the density of the at least one metallocene-catalyzed polyethylene resin.

15. The metallocene-catalyzed polyethylene resin according to any one of statements 1 to 14, wherein fraction B has a density of at most 0.935 g/cm³, preferably at most 0.933 g/cm³.

16. The metallocene-catalyzed polyethylene resin according to any one of statements 1 to 15, wherein fraction B has a density of at least 0.915 g/cm³, preferably at least 0.918 g/cm³, at least 0.920 g/cm³, at least 0.925 g/cm³.

17. The metallocene-catalyzed polyethylene resin according to any one of statements 1 to 16, having a density of at least 0.938 g/cm³ to at most 0.950 g/cm³, preferably of at least 0.939 g/cm³ to at most 0.950 g/cm³, preferably of at least 0.940 g/cm³ to at most 0.949 g/cm³.

18. The metallocene-catalyzed polyethylene resin according to any one of statements 1 to 17, having a melt index MI2 of preferably of at least 2.5 g/10 min to at most 20.0 g/10 min, preferably of at least 2.5 g/10 min to at most 15.0 g/10 min, preferably of at least 2.5 g/10 min to at most 11.0 g/10 min, preferably of at least 2.5 g/10 min to at most 10.0 g/10 min, preferably of at least 2.5 g/10 min to at most 8.0 g/10 min, preferably at least 2.5 g/10 min to at most 6.0 g/10 min.

19. The metallocene-catalyzed polyethylene resin according to any one of statements 1 to 18, having a rheology long chain branching index $g_{rheo}$ of at most 0.99, for example at most 0.98, for example at most 0.97, for example at most 0.96.

20. The metallocene-catalyzed polyethylene resin according to any one of statements 1 to 19, having a multimodal molecular weight distribution, preferably having a bimodal molecular weight distribution.

21. The metallocene-catalyzed polyethylene resin according to any one of statements 1 to 20, wherein each fraction is prepared in different reactors of at least two reactors connected in series, preferably at least two loop reactors connected in series, 22. The metallocene-catalyzed polyethylene resin according to any one of statements 1 to 21, wherein each fraction is prepared in different reactors of at least two slurry loop reactors connected in series.
23. The metallocene-catalyzed polyethylene resin according to any one of statements 1 to 22, wherein said metallocene-catalyzed polyethylene resin is prepared using a process comprising the steps of:
    (a) feeding ethylene monomer, a diluent, at least one metallocene catalyst, optionally hydrogen, and optionally one or more olefin co-monomers into at least one first slurry loop reactor; polymerizing the ethylene monomer, and the optionally one or more olefin co-monomers, in the presence of the metallocene catalyst, and optional hydrogen, in said first slurry loop reactor to produce a first polyethylene fraction A; and
    (b) feeding the first polyethylene fraction A to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing the metallocene catalyzed-polyethylene resin.
24. The metallocene-catalyzed polyethylene resin according to any one of statements 1 to 23, wherein the metallocene-catalyzed polyethylene resin is prepared using a process comprising the steps of:
    (a) feeding ethylene monomer, a diluent, at least one metallocene catalyst, optionally hydrogen, into at least one first slurry loop reactor; polymerizing the ethylene monomer, in the presence of the metallocene catalyst, and optional hydrogen, in said first slurry loop reactor to produce a first polyethylene fraction A; and
    (b) feeding the first polyethylene fraction A to a second slurry loop reactor serially connected to the first slurry loop reactor, and in the second slurry loop reactor polymerizing ethylene, and one or more olefin co-monomers, in the presence of the first polyethylene fraction, and optionally hydrogen, thereby producing the metallocene catalyzed-polyethylene resin.
25. The metallocene-catalyzed polyethylene resin according to any one of statements 1 to 24, wherein fraction A is an ethylene homopolymer and fraction B is an ethylene copolymer.
26. An article comprising the metallocene-catalyzed polyethylene resin according to any one of statements 1 to 25.
27. The article according to statement 26, wherein the article is produced by a polymer processing technique selected from the group comprising rotomolding, blow molding, injection molding, compression molding, film casting, 3D printing, extrusion, and thermoforming.
28. The article according to any one of statements 26 or 27, wherein said article is a rotomolded article.
29. The article according to any one of statements 26 to 28, wherein the article is a tank, a drum, a container, a bin, a vat, a jerrycan, a can, a cistern, or bottle, boat or parts thereof, floats, buoys, fibers, caps and closure, cast film, structural parts.

The present invention relates to a metallocene-catalyzed polyethylene resin comprising at least two metallocene-catalyzed polyethylene fractions A and B, wherein the polyethylene resin comprises:
at least 25% to at most 55% by weight of polyethylene fraction A based on the total weight of the polyethylene resin, wherein fraction A has a density at least 0.005 g/cm$^3$ higher than the density of the polyethylene resin;
wherein the polyethylene resin has a density of at least 0.938 g/cm$^3$ to at most 0.954 g/cm$^3$ as measured according to ASTM D-1505 at 23° C.; a melt index MI2 of at least 2.5 g/10 min to at most 25.0 g/10 min as determined according to ISO 1133, condition D, at 190° C. and under a load of 2.16 kg, and a molecular weight distribution Mw/Mn of at least 2.6 to at most 4.2, with Mw being the weight-average molecular weight and Mn being the number-average molecular weight. Preferably, fraction A has a melt index MI2 of at least 25.0 g/10 min as determined according to ISO 1133, condition D, at 190° C. and under a load of 2.16 kg.

Preferably, the polyethylene resin comprises: at least 25% to at most 55% by weight of polyethylene fraction A based on the total weight of the polyethylene resin, wherein fraction A has a density at least 0.005 g/cm$^3$ higher than the density of the polyethylene resin; wherein the polyethylene resin has a density of at least 0.938 g/cm$^3$ to at most 0.950 g/cm$^3$ as measured according to ASTM D-1505 at 23° C.; a melt index MI2 of at least 2.5 g/10 min to at most 25.0 g/10 min as determined according to ISO 1133, condition D, at 190° C. and under a load of 2.16 kg, and a molecular weight distribution $M_w/M_n$ of at least 2.6 to at most 4.2, with $M_w$ being the weight-average molecular weight and $M_n$ being the number-average molecular weight. Preferably, fraction A has a melt index MI2 of at least 25.0 g/10 min as determined according to ISO 1133, condition D, at 190° C. and under a load of 2.16 kg.

The term "polyethylene resin" as used herein refers to the polyethylene fluff or powder that is extruded, and/or melted and/or pelleted and can be produced through compounding and homogenizing of the polyethylene resin as taught herein, for instance, with mixing and/or extruder equipment.

The term "fluff" or "powder" as used herein refers to the polyethylene material with the hard catalyst particle at the core of each grain and is defined as the polymer material after it exits the polymerization reactor (or final polymerization reactor in the case of multiple reactors connected in series).

In some embodiments, fraction A has a density as measured on the polymer material after it exits the polymerization reactor of at least 0.005 g/cm$^3$ higher than the density of the polyethylene resin, preferably at least 0.010 g/cm$^3$ higher, preferably at least 0.015 g/cm$^3$ higher, preferably at least 0.020 g/cm$^3$ higher than the density of the at least one metallocene-catalyzed polyethylene resin. In some embodiments, fraction A has a density as measured on the polymer material after it exits the polymerization reactor of at least 0.950 g/cm$^3$; preferably of at least 0.955 g/cm$^3$, preferably of at least 0.958 g/cm$^3$, preferably of at least 0.960 g/cm$^3$. In some embodiments, fraction A has a melt index MI2 as measured on the polymer material after it exits the polymerization reactor of at least 25.0 g/10 min, preferably at least 30.0 g/10 min, preferably at least 35.0 g/10 min, preferably of at least 40.0 g/10 min, preferably of at least 45.0 g/10 min.

In a preferred embodiment, the metallocene-catalyzed polyethylene resin has a multimodal molecular weight distribution. In some embodiments, the metallocene-catalyzed polyethylene resin has a bimodal molecular weight distribution.

As used herein, the term "monomodal polyethylene" or "polyethylene with a monomodal molecular weight distribution" refers to polyethylene having one maximum in their molecular weight distribution curve, which is also defined as a unimodal distribution curve. As used herein, the term "polyethylene with a bimodal molecular weight distribution" or "bimodal polyethylene" it is meant, polyethylene having a distribution curve being the sum of two unimodal molecular weight distribution curves, and refers to a polyethylene product having two distinct but possibly overlapping populations of polyethylene macromolecules each having different weight average molecular weights. By the term "polyethylenes with a multimodal molecular weight distribution" or "multimodal polyethylenes" it is meant polyethylenes with a distribution curve being the sum of at least two, preferably more than two unimodal distribution curves, and refers to a polyethylene product having two or more distinct but possibly overlapping populations of polyethylene macromolecules each having different weight average molecular weights. The multimodal polyethylene resin can have an "apparent monomodal" molecular weight distribution, which is a molecular weight distribution curve with a single peak and no shoulder. Nevertheless, the polyethylene resin will still be multimodal if it comprises two distinct populations of polyethylene macromolecules each having a different weight average molecular weights, as defined above, for example when the two distinct populations were prepared in different reactors and/or under different conditions.

The polyethylene resin having a multimodal, preferably bimodal, molecular weight distribution can be produced by polymerizing ethylene and one or more optional comonomers, optionally hydrogen, in the presence of a metallocene catalyst system.

As used herein, the term "catalyst" refers to a substance that causes a change in the rate of a polymerization reaction. In the present invention, it is especially applicable to catalysts suitable for the polymerization of ethylene to polyethylene. The present invention especially relates to polyethylene prepared in the presence of metallocene catalyst. As used herein, the terms "metallocene-catalyzed polyethylene resin", and "metallocene-catalyzed polyethylene" are synonymous and used interchangeably and refers to a polyethylene prepared in the presence of a metallocene catalyst.

The term "metallocene catalyst" is used herein to describe any transition metal complexes comprising metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In one embodiment of the present invention, the metallocene catalyst is a compound of formula (I) or (II)

(Ar)$_2$MQ$_2$ (I); or

R"(Ar)$_2$MQ$_2$ (II), wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl (IND), tetrahydroindenyl (THI), and fluorenyl, wherein each of said groups may be optionally substituted with one or more substituents each independently selected from the group consisting of halogen, hydrosilyl, SiR$_3$ wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl, and P;

wherein M is a transition metal selected from the group consisting of titanium, zirconium, hafnium, and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl, and P; and wherein R" is a divalent group or moiety bridging the two Ar groups and selected from the group consisting of C$_1$-C$_{20}$ alkylene, germanium, silicon, siloxane, alkylphosphine, and an amine, and wherein said R" is optionally substituted with one or more substituents each independently selected from the group consisting of halogen, hydrosilyl, SiR$_3$ wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl, and P.

Preferably, the metallocene comprises a bridged bis-indenyl and/or a bridged bis-tetrahydrogenated indenyl component. In some embodiments, the metallocene can be selected from one of the following formula (IVa) or (IVb):

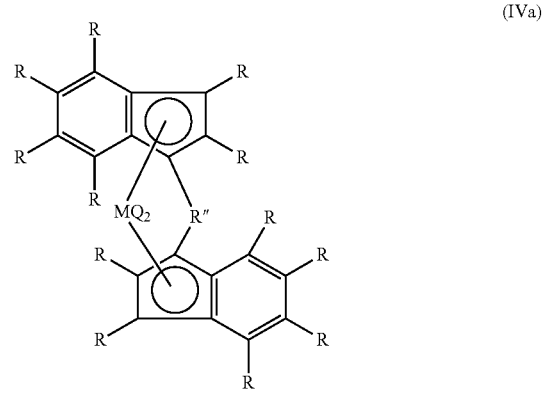

(IVa)

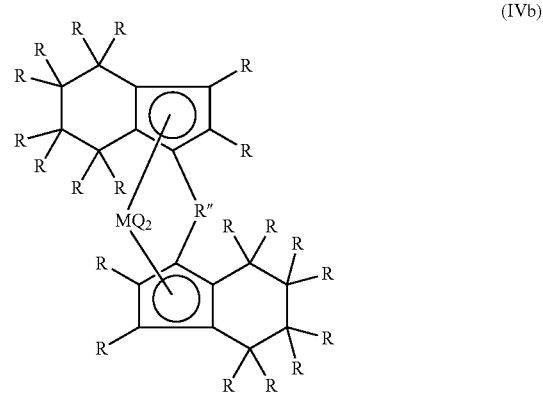

(IVb)

wherein each R in formula (IVa) or (IVb) is the same or different and is selected independently from hydrogen or XR'$_v$ in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group; R" is a structural bridge between the two indenyl or tetrahydrogenated indenyls that comprises a $C_1$-$C_4$ alkylene radical, a dialkyl germanium, silicon or siloxane, or an alkyl phosphine or amine radical; Q is a hydrocarbyl radical having from 1 to 20 carbon atoms or a halogen, preferably Q is F, Cl or Br; and M is a transition metal Group 4 of the Periodic Table or vanadium.

Each indenyl or tetrahydro indenyl component may be substituted with R in the same way or differently from one another at one or more positions of either of the fused rings. Each substituent is independently chosen.

If the cyclopentadienyl ring is substituted, its substituent groups must not be so bulky so as to affect coordination of the olefin monomer to the metal M. Any substituents $XR'_v$ on the cyclopentadienyl ring are preferably methyl. More preferably, at least one and most preferably both cyclopentadienyl rings are unsubstituted.

In a particularly preferred embodiment, the metallocene comprises a bridged unsubstituted bis-indenyl and/or bis-tetrahydrogenated indenyl i.e. all R are hydrogens. More preferably, the metallocene comprises a bridged unsubstituted bis-tetrahydrogenated indenyl.

Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis(indenyl) zirconium dichloride, and bis(n-butyl-cyclopentadienyl) zirconium dichloride; ethylenebis (4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride. Most preferably the metallocene is ethylene-bis (tetrahydroindenyl)zirconium dichloride or ethylene-bis (tetrahydroindenyl) zirconium difluoride.

As used herein, the term "hydrocarbyl having 1 to 20 carbon atoms" refers to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl.

As used herein, the term "hydrocarboxy having 1 to 20 carbon atoms" refers to a moiety with the formula hydrocarbyl-O—, wherein the hydrocarbyl has 1 to 20 carbon atoms as described herein. Preferred hydrocarboxy groups are selected from the group comprising alkyloxy, alkenyloxy, cycloalkyloxy or aralkoxy groups.

As used herein, the term "alkyl", by itself or as part of another substituent, refers to straight or branched saturated hydrocarbon group joined by single carbon-carbon bonds having 1 or more carbon atom, for example 1 to 12 carbon atoms, for example 1 to 6 carbon atoms, for example 1 to 4 carbon atoms. When a subscript is used herein following a carbon atom, the subscript refers to the number of carbon atoms that the named group may contain. Thus, for example, $C_{1-12}$alkyl means an alkyl of 1 to 12 carbon atoms. Examples of alkyl groups are methyl, ethyl, propyl, isopropyl, butyl, isobutyl, sec-butyl, tert-butyl, 2-methylbutyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers. Alkyl groups have the general formula $C_nH_{2n+1}$.

As used herein, the term "cycloalkyl", by itself or as part of another substituent, refers to a saturated or partially saturated cyclic alkyl radical. Cycloalkyl groups have the general formula $C_nH_{2n-1}$. When a subscript is used herein following a carbon atom, the subscript refers to the number of carbon atoms that the named group may contain. Thus, examples of $C_{3-6}$cycloalkyl include cyclopropyl, cyclobutyl, cyclopentyl, or cyclohexyl.

As used herein, the term "aryl", by itself or as part of another substituent, refers to a radical derived from an aromatic ring, such as phenyl, naphthyl, indanyl, or 1,2,3, 4-tetrahydro-naphthyl. When a subscript is used herein following a carbon atom, the subscript refers to the number of carbon atoms that the named group may contain.

As used herein, the term "alkylaryl", by itself or as part of another substituent, refers to refers to an aryl group as defined herein, wherein a hydrogen atom is replaced by an alkyl as defined herein. When a subscript is used herein following a carbon atom, the subscript refers to the number of carbon atoms that the named group or subgroup may contain.

As used herein, the term "arylalkyl", by itself or as part of another substituent, refers to refers to an alkyl group as defined herein, wherein a hydrogen atom is replaced by an aryl as defined herein. When a subscript is used herein following a carbon atom, the subscript refers to the number of carbon atoms that the named group may contain. Examples of $C_{6-10}$aryl$C_{1-6}$alkyl radicals include benzyl, phenethyl, dibenzylmethyl, methylphenylmethyl, 3-(2-naphthyl)-butyl, and the like.

As used herein, the term "alkylene", by itself or as part of another substituent, refers to alkyl groups that are divalent, i.e., with two single bonds for attachment to two other groups. Alkylene groups may be linear or branched and may be substituted as indicated herein. Non-limiting examples of alkylene groups include methylene (—$CH_2$—), ethylene (—$CH_2$—$CH_2$—), methylmethylene (—$CH(CH_3)$—), 1-methyl-ethylene (—$CH(CH_3)$—$CH_2$—), n-propylene (—$CH_2$—$CH_2$—$CH_2$—), 2-methylpropylene (—$CH_2$—$CH$($CH_3$)—$CH_2$—), 3-methylpropylene (—$CH_2$—$CH_2$—$CH$ ($CH_3$)—), n-butylene (—$CH_2$—$CH_2$—$CH_2$—$CH_2$—), 2-methylbutylene (—$CH_2$—$CH(CH_3)$—$CH_2$—$CH_2$—), 4-methylbutylene (—$CH_2$—$CH_2$—$CH_2$—$CH(CH_3)$—), pentylene and its chain isomers, hexylene and its chain isomers, heptylene and its chain isomers, octylene and its chain isomers, nonylene and its chain isomers, decylene and its chain isomers, undecylene and its chain isomers, dodecylene and its chain isomers. When a subscript is used herein following a carbon atom, the subscript refers to the number of carbon atoms that the named group may contain. For example, $C_1$-$C_{20}$ alkylene refers to an alkylene having between 1 and 20 carbon atoms.

Exemplary halogen atoms include chlorine, bromine, fluorine and iodine, wherein fluorine and chlorine are preferred.

The metallocene catalysts used herein are preferably provided on a solid support. The support can be an inert organic or inorganic solid, which is chemically unreactive with any of the components of the conventional metallocene catalyst. Suitable support materials for the supported catalyst include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is a silica compound. In a preferred embodiment, the metallocene catalyst is provided on a solid support, preferably a silica support. The silica may be in granular, agglomerated, fumed or other form.

In some embodiments, the support of the metallocene catalyst is a porous support, and preferably a porous silica support having a surface area comprised between 200 m$^2$/g and 900 m$^2$/g. In another embodiment, the support of the polymerization catalyst is a porous support, and preferably a porous silica support having an average pore volume comprised between 0.5 ml/g and 4 ml/g. In yet another embodiment, the support of the polymerization catalyst is a porous support, and preferably a porous silica support having an average pore diameter comprised between 50 Å and 300 Å, and preferably between 75 Å and 220 Å.

Preferably, the supported metallocene catalyst is activated. The cocatalyst, which activates the metallocene catalyst component, can be any cocatalyst known for this purpose such as an aluminium-containing cocatalyst, a boron-containing cocatalyst or a fluorinated catalyst. The aluminium-containing cocatalyst may comprise an alumoxane, an alkyl aluminium, a Lewis acid and/or a fluorinated catalytic support.

In some embodiments, alumoxane is used as an activating agent for the metallocene catalyst. The alumoxane can be used in conjunction with a catalyst in order to improve the activity of the catalyst during the polymerization reaction.

As used herein, the term "alumoxane" and "aluminoxane" are used interchangeably, and refer to a substance, which is capable of activating the metallocene catalyst. In some embodiments, alumoxanes comprise oligomeric linear and/or cyclic alkyl alumoxanes. In a further embodiment, the alumoxane has formula (V) or (VI)

$$R^a\text{—}(Al(R^a)\text{—}O)_x\text{—}AlR^a{}_2 \text{(V) for oligomeric, linear alumoxanes; or}$$

$$(\text{—}Al(R^a)\text{—}O\text{—})_y \quad \text{(VI) for oligomeric, cyclic alumoxanes}$$

wherein x is 1-40, and preferably 10-20;
wherein y is 3-40, and preferably 3-20; and
wherein each $R^a$ is independently selected from a $C_1$-$C_8$alkyl, and preferably is methyl. In a preferred embodiment, the alumoxane is methylalumoxane (MAO).

In a preferred embodiment, the metallocene catalyst is a supported metallocene-alumoxane catalyst comprising a metallocene and an alumoxane which are bound on a porous silica support. Preferably, the metallocene catalyst is a bridged bis-indenyl catalyst and/or a bridged bis-tetrahydrogenated indenyl catalyst.

One or more aluminiumalkyl represented by the formula $AlR^b{}_x$ can be used as additional co-catalyst, wherein each $R^b$ is the same or different and is selected from halogens or from alkoxy or alkyl groups having from 1 to 12 carbon atoms and x is from 1 to 3. Non-limiting examples are Tri-Ethyl Aluminum (TEAL), Tri-Iso-Butyl Aluminum (TIBAL), Tri-Methyl Aluminum (TMA), and Methyl-Methyl-Ethyl Aluminum (MMEAL). Especially suitable are trialkylaluminiums, the most preferred being triisobutylaluminium (TIBAL) and triethylaluminum (TEAL).

Suitable ethylene polymerization includes but is not limited to homopolymerization of ethylene, or copolymerization of ethylene and a higher 1-olefin co-monomer.

As used herein, the term "co-monomer" refers to olefin co-monomers which are suitable for being polymerized with alpha-olefin monomer. Co-monomers may comprise but are not limited to aliphatic C3-C20 alpha-olefins. Examples of suitable aliphatic C3-C20 alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene. In some embodiments of the present invention, said co-monomer is 1-hexene.

In a preferred embodiment, fraction A is an ethylene homopolymer. In a preferred embodiment, fraction B is an ethylene copolymer. The term "ethylene copolymer" as used herein is intended to encompass polymers which consist essentially of repeat units deriving from ethylene and at least one other C3-C20 alpha olefin co-monomer, preferably the co-monomer is 1-hexene. The term "ethylene homopolymer" as used herein is intended to encompass polymers which consist essentially of repeat units deriving from ethylene. Homopolymers may, for example, comprise at least 99.8% preferably 99.9% by weight of repeats units derived from ethylene.

Preferably, the polyethylene resin is prepared in two or more serially connected reactors. In some embodiments, the metallocene-catalyzed polyethylene resin comprises two metallocene-catalyzed polyethylene fractions A and B, wherein each fraction is prepared in different reactors of two reactors connected in series.

The metallocene-catalyzed polyethylene resin is preferably obtained by operating the at least two reactors under different polymerization conditions.

The metallocene-catalyzed polyethylene resin can be prepared out in gas, solution or slurry phase. Slurry polymerization is preferably used to prepare the polyethylene resin composition, preferably in a slurry loop reactor or a continuously stirred reactor.

Preferably, the metallocene-catalyzed polyethylene resin is prepared in two or more serially connected reactors, comprising at least one first and at least one second reactors, preferably loop reactors, more preferably slurry loop reactors, most preferably liquid full loop reactors in the presence of same or different metallocene catalysts. The most preferred polymerization process is carried out in two serially connected slurry loop reactors, advantageously liquid full loop reactors i.e. a double loop reactor.

As used herein, the terms "loop reactor" and "slurry loop reactor" may be used interchangeably herein.

The catalyst is preferably added to the loop reactor as catalyst slurry. As used herein, the term "catalyst slurry" refers to a composition comprising catalyst solid particles and a diluent. The solid particles can be suspended in the diluent, either spontaneously or by homogenization techniques, such as mixing. The solid particles can be non-homogeneously distributed in a diluent and form sediment or deposit.

As used herein, the term "diluent" refers to any organic diluent, which does not dissolve the synthesized polyolefin. As used herein, the term "diluent" refers to diluents in a liquid state, liquid at room temperature and preferably liquid under the pressure conditions in the loop reactor. Suitable diluents comprise but are not limited to hydrocarbon diluents such as aliphatic, cycloaliphatic and aromatic hydrocarbon solvents, or halogenated versions of such solvents. Preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane, preferably isobutane.

In certain embodiments, each loop reactor may comprise interconnected pipes, defining a reactor path. In certain embodiments, each loop reactor may comprise at least two vertical pipes, at least one upper segment of reactor piping, at least one lower segment of reactor piping, joined end to end by junctions to form a complete loop, one or more feed lines, one or more outlets, one or more cooling jackets per pipe, and one pump, thus defining a continuous flow path for a polymer slurry. The vertical sections of the pipe segments are preferably provided with cooling jackets. Polymerization heat can be extracted by means of cooling water circulating in these jackets of the reactor. The loop reactor preferably operates in a liquid full mode.

In certain embodiments, the first and second loop reactors may be connected through means such as a transfer line or one or more settling legs. In some embodiments, the first polyethylene fraction may be transferred from the first loop reactor to the second loop reactor through a transfer line. In some embodiments, the first polyethylene fraction may be discharged in batches, sequentially or continuously from the first loop reactor through one or more settling legs, and transferred to the second loop reactor via a transfer line.

In some embodiments, the metallocene-catalyzed polyethylene resin is prepared using a process comprising the steps of:

(a) feeding ethylene monomer, a diluent, at least one metallocene catalyst, optionally hydrogen, and optionally one or more olefin co-monomers into at least one first slurry loop reactor; polymerizing the ethylene monomer, and the optionally one or more olefin co-monomers, in the presence of the metallocene catalyst, and optional hydrogen, in said first slurry loop reactor to produce a first polyethylene fraction; and (b) feeding the first polyethylene fraction to a second slurry loop reactor serially connected to the first slurry loop reactor, and in the second slurry loop reactor polymerizing ethylene, and optionally one or more olefin co-monomers, in the presence of the first polyethylene fraction, and optionally hydrogen, thereby producing the metallocene catalyzed-polyethylene resin.

The polymerization steps can be performed over a wide temperature range. In certain embodiments, the polymerization steps may be performed at a temperature from 20° C. to 125° C., preferably from 60° C. to 110° C., more preferably from 75° C. to 100° C. and most preferably from 78° C. to 98° C. Preferably, the temperature range may be within the range from 75° C. to 100° C. and most preferably from 78° C. to 98° C.

In certain embodiments, the polymerization steps may be performed at a pressure from about 20 bar to about 100 bar, preferably from about 30 bar to about 50 bar, and more preferably from about 37 bar to about 45 bar.

In some embodiments, reactants comprise the monomer ethylene, isobutane as hydrocarbon diluent, a supported metallocene catalyst, and optionally at least one co-monomer such as 1-hexene are used.

In some embodiments, the metallocene-catalyzed polyethylene resin comprises two metallocene-catalyzed polyethylene fractions A and B, and comprises:

at least 35% to at most 50% by weight of polyethylene fraction A based on the total weight of the polyethylene resin, wherein fraction A has a density at least 0.010 g/cm$^3$ higher than the density of the polyethylene resin;

wherein the metallocene-catalyzed polyethylene resin has a density of at least 0.938 to at most 0.954 g/cm$^3$ as measured according to ASTM D-1505 at 23° C.; a melt index MI2 of at least 2.5 g/10 min to at most 25.0 g/10 min, and a molecular weight distribution $M_w/M_n$ of at least 2.6 to at most 4.2, with $M_w$ being the weight-average molecular weight and $M_n$ being the number-average molecular weight. Preferably, fraction A has a melt index MI2 of at least 25.0 g/10 min, preferably at least 30.0 g/10 min, more preferably at least 35.0 g/10 min, preferably of at least 40.0 g/10 min, preferably of at least 45.0 g/10 min.

In a preferred embodiment, the metallocene-catalyzed polyethylene resin comprises two polyethylene fractions A and B, fraction B having a higher molecular weight and a lower density than fraction A, with each fraction being prepared in different reactors of two slurry loop reactors connected in series. The molecular weight of the fractions prepared in each of the reactors can be adjusted by known techniques such as varying the amount of hydrogen used. The density of the fractions prepared in each of the reactors can be adjusted by known techniques such as varying the amount of co-monomer used.

In a preferred embodiment, fraction A has a density at least 0.005 g/cm$^3$ higher than the density of the polyethylene resin, preferably at least 0.010 g/cm$^3$ higher, preferably at least 0.015 g/cm$^3$ higher, more preferably at least 0.020 g/cm$^3$ higher than the density of the polyethylene resin.

In a preferred embodiment, polyethylene fraction A has a density as measured on the fluff of at least 0.950 g/cm$^3$, preferably of at least 0.955 g/cm$^3$, preferably of at least 0.960 g/cm$^3$, preferably of at least 0.965 g/cm$^3$.

In a preferred embodiment, polyethylene fraction A has a melt index MI2 as measured on the fluff of at least 15.0 g/10 min to at most 110.0 g/10 min, preferably of at least 20.0 g/10 min to at most 110 g/10 min, preferably of at least 25.0 g/10 min to at most 110 g/10 min, preferably of at least 30.0 g/10 min to at most 110 g/10 min, preferably of at least 35.0 g/10 min to at most 105 g/10 min, preferably of at least 40 g/10 min to at most 100 g/10 min.

In an embodiment, fraction A is present in an amount ranging from at least 25% to at most 55% by weight based on the total weight of polyethylene resin; preferably ranging from 30% to 50%, for example from 35% to 45%, preferably from 38% to 42%, by weight based on the total weight of polyethylene resin.

In some embodiments, the metallocene-catalyzed polyethylene resin according to the present invention has a density of at least 0.938 g/cm$^3$ to at most 0.954 g/cm$^3$, preferably at least 0.938 to at most 0.950 g/cm$^3$, preferably of at least 0.939 g/cm$^3$ to at most 0.950 g/cm$^3$, preferably of at least 0.940 g/cm$^3$ to at most 0.949 g/cm$^3$.

In some embodiments, the metallocene-catalyzed polyethylene resin according to the present invention has a melt index MI2 of at least 3.0 g/10 min to at most 20.0 g/10 min, preferably the polyethylene resin has a melt index MI2 of at least 3.5 g/10 min to at most 15.0 g/10 min, preferably of at least 3.5 g/10 min to at most 11.0 g/10 min, preferably at least 3.5 g/10 min to at most 10.0 g/10 min, preferably at least 3.5 g/10 min to at most 8.0 g/10 min, preferably at least 3.5 g/10 min to at most 6.0 g/10 min. Under normal production conditions in a production plant it is expected that the melt index MI2 will be higher for the fluff.

In some embodiments, the metallocene-catalyzed polyethylene resin according to the present invention has an HLMI of at least 85.0 g/10 min to at most 200.0 g/10 min as measured according to ISO 1133:1997 condition G at 190° C. and under a load of 21.6 kg. Preferably the polyethylene resin has an HLMI of at least 90.0 g/10 min to at most 180.0 g/10 min, preferably of at least 95.0 g/10 min to at most 180.0 g/10 min, preferably of at least 100 g/10 min to at most 170.0 g/10 min, preferably of at least 100 g/10 min to at most 160.0 g/10 min, preferably of at least 100.0 g/10 min to at most 150.0 g/10 min.

The metallocene-catalyzed polyethylene resin according to the present invention has a molecular weight distribution $M_w/M_n$ of at least 2.6 to at most 4.2. Preferably the metallocene-catalyzed polyethylene resin according to the present invention has a molecular weight distribution $M_w/M_n$ of at least 2.7 to at most 4.0, preferably of at least 2.8 to at most 3.8, preferably of at least 2.9 to at most 3.5.

As used herein, the molecular weight ($M_n$ (number average molecular weight), $M_w$ (weight average molecular weight) and molecular weight distributions D ($M_w/M_n$), and D' ($M_z/M_w$) were determined by size exclusion chromatography (SEC) and in particular by gel permeation chromatography (GPC).

In some embodiments, the metallocene-catalyzed polyethylene resin according to the present invention has a rheology long chain branching index $g_{rheo}$ at most 0.99, for example at most 0.98, for example at most 0.97, for example at most 0.96. As used herein the long chain branching (LCB) index $g_{rheo}$ can be obtained by rheology according to the formula, as described in the example section.

In some embodiments, the metallocene-catalyzed polyethylene resin according to the present invention has a rheology long chain branching index $g_{rheo}$ of at least 0.70, for example at least 0.74, for example at least 0.78, for example at least 0.80, for example at least 0.84, for example at least 0.88, for example at least 0.90.

In some embodiments, the metallocene-catalyzed polyethylene resin according to the present invention has a rheology long chain branching index $g_{rheo}$ at least 0.70 to at most 0.99. Preferably of the polyethylene resin has a rheology long chain branching index $g_{rheo}$ at least 0.74 to at most 0.98; preferably of at least 0.78 to at most 0.97; preferably of at least 0.80 to at most 0.96, preferably of at least 0.85 to at most 0.92.

In some embodiments, the metallocene-catalyzed polyethylene resin according to the present invention comprises from at least 45% to at most 75% by weight of polyethylene fraction B based on the total weight of the polyethylene resin. Preferably the metallocene-catalyzed polyethylene resin comprises from at least 50% to at most 75% by weight of polyethylene fraction B based on the total weight of the polyethylene resin, preferably from at least 55% to at most 70%, preferably from at least 56% to at most 65%, preferably from at least 58% to at most 62%.

In some embodiments, the metallocene-catalyzed polyethylene resin according to the present invention has a Temperature Rising Elution Fractionation (TREF) distribution curve of the resin comprises at least one peak appearing at a temperature of at least 97.0° C. to at most 105.0° C. and having an area under the curve of at least 5.0% to at most 25.0%; as determined using a crystallization rate of −0.5° C./min from 95° C. to 35° C., and column load volume of 1.90 ml. Preferably, the metallocene-catalyzed polyethylene resin according to the present invention has a Temperature Rising Elution Fractionation (TREF) distribution curve of the resin comprises at least one peak appearing at a temperature of at least 99.0° C. to at most 103.0° C. and having an area under the curve of at least 5.0% to at most 25.0%; as determined using a crystallization rate of −0.5° C./min from 95° C. to 35° C., and column load volume of 1.90 ml. Preferably, the metallocene-catalyzed polyethylene resin according to the present invention has a Temperature Rising Elution Fractionation (TREF) distribution curve of the resin comprises at least one peak appearing at a temperature of at least 100.0° C. to at most 102.0° C. and having an area under the curve of at least 5.0% to at most 25.0%; as determined using a crystallization rate of −0.5° C./min from 95° C. to 35° C., and column load volume of 1.90 ml.

Preferably, the Temperature Rising Elution Fractionation (TREF) distribution curve of the resin further comprises two more peaks having the following features:

peak 1 appearing at a temperature of at least 87.0° C. to at most 93.0° C. and having an area under the curve of at least 25.0% to at most 50.0%;

peak 2 appearing at a temperature of at least 94.0° C. to at most 98.0° C. and having an area under the curve of at least 35.0% to at most 60.0%.

In some embodiments, the metallocene-catalyzed polyethylene resin according to the present invention has a Temperature Rising Elution Fractionation (TREF) distribution curve characterized by three peaks having the following features:

a) peak 1 appearing at a temperature of at least 87.0° C. to at most 93.0° C. and having an area under the curve of at least 25.0% to at most 50.0%;

b) peak 2 appearing at a temperature of at least 94.0° C. to at most 98.0° C. and having an area under the curve of at least 35.0% to at most 60.0%;

c) peak 3 appearing at a temperature of at least 99.0° C. to at most 103.0° C. and having an area under the curve of at least 5.0% to at most 25.0%.

In some embodiments, the metallocene-catalyzed polyethylene resin according to the present invention has a Temperature Rising Elution Fractionation (TREF) distribution curve characterized by three peaks having the following features:

a) peak 1 appearing at a temperature of at least 87.0° C. to at most 93.0° C. and having an area under the curve of at least 25.0% to at most 50.0%;

b) peak 2 appearing at a temperature of at least 94.0° C. to at most 98.0° C. and having an area under the curve of at least 35.0% to at most 60.0%;

c) peak 3 appearing at a temperature of at least 100.0° C. to at most 102.0° C. and having an area under the curve of at least 5.0% to at most 25.0%.

For metallocene-catalyzed polyethylene resin comprising two fractions A and B, wherein fraction B is prepared in the second reactor, the density of fraction B is linked to that of the density of fraction A by the following expression:

$$d = W_A * d_A + (1-W_A) * d_B$$

wherein d is the density of the final polyethylene fluff, $W_A$ is the weight fraction of fraction A, $d_A$ is the density of fraction A, $d_B$ is the density of fraction B, and wherein the sum of both fractions A and B by weight ($W_A + W_B$) is 1. A similar formula can be expressed for any polyethylene resin comprising more than two fractions.

In some embodiments, the metallocene-catalyzed polyethylene resin according to the present invention comprises a polyethylene fraction B having a density of at least 0.915 g/cm³ to at most 0.935 g/cm³.

For metallocene-catalyzed polyethylene resin comprising two fractions A and B, the HLMI of fraction B is linked to that of the HLMI of fraction A by the following expression:

$$\text{Log HLMI}^{final} = W_A \times \text{Log HLMI}_A + W_B \times \text{Log HLMI}_B$$

wherein Log HLMI$^{final}$ is the Log HLMI of the final polyethylene fluff, $W_A$ is the weight fraction of fraction A, Log HLMI$_A$ is the Log HLMI of fraction A, Log HLMI$_B$ is the Log HLMI of fraction B, and wherein the sum of both fractions A and B by weight (W$_A$+W$_B$) is 1. A similar formula can be expressed for any polyethylene resin comprising more than two fractions.

For metallocene-catalyzed polyethylene resin comprising two fractions A and B, the MI2 of fraction B is linked to that of the MI2 of fraction A by the following expression:

$$\text{Log MI2}^{final} = W_A \times \text{Log MI2}_A + W_B \times \text{Log MI2}_B$$

wherein Log MI2$^{final}$ is the Log MI2 of the final polyethylene fluff, W$_A$ is the weight fraction of fraction A, Log MI2$_A$ is the Log MI2 of fraction A, Log MI2$_B$ is the Log MI2 of fraction B, and wherein the sum of both fractions A and B by weight (W$_A$+W$_B$) is 1. A similar formula can be expressed for any multimodal polyethylene resin comprising more than two fractions.

In some embodiments, the metallocene-catalyzed polyethylene resin according to the present invention comprises a fraction B having a melt index MI2 of at most 5.0 g/10 min, preferably at most 3.0 g/10 min, preferably at most 2.5 g/10 min, preferably at most 2.0 g/10 min, preferably at least 0.10 g/10 min, preferably at least 0.5 g/10 min.

The at least one metallocene-catalyzed polyethylene resin may be compounded with one or more additives, in particular additives such as, by way of example, processing aids, mold-release agents, anti-slip agents, primary and secondary antioxidants, light stabilizers, anti-UV agents, acid scavengers, flame retardants, fillers, nanocomposites, lubricants, antistatic additives, nucleating/clarifying agents, antibacterial agents, plastisizers, colorants/pigments/dyes, sealant resins and mixtures thereof. Illustrative pigments or colorants include titanium dioxide, carbon black, cobalt aluminum oxides such as cobalt blue, and chromium oxides such as chromium oxide green. Pigments such as ultramarine blue, phthalocyanine blue and iron oxide red are also suitable. Specific examples of additives include lubricants and mold-release agents such as calcium stearate, zinc stearate, SHT, antioxidants such as Irgafos®168, Irganox®1010, and Irganox®1076, anti-slip agents such as erucamide, light stabilizers such as Tinuvin®622, Tinuvin®326 and Cyasorb THT®4611, ionomers, and nucleating agents such as Milliken HPN20E™.

In some embodiments, the at least one metallocene-catalyzed polyethylene resin may be compounded with one or more ionomers. Suitable ionomers include polyelectrolyte that comprises copolymers containing both electrically neutral repeating units and a fraction of ionized or ionizable units. They link in such a way that, even though they are stiff at room temperature, the bonds may be broken down thermally and the new linkages will cause the material to act as though it were a thermoplastic material.

In particular embodiments, the ionomer can be:
- a copolymer comprising one or more olefin monomers (such as ethylene, propylene, 1-butene, etc.) or styrene monomers (such as styrene, 2-methylstyrene, 3-methylstyrene, etc.), and one or more monomers comprising a functional group selected from the group comprising carboxylate, sulfonate, and a carboxylic acid anhydride; or
- a grafted polyolefin or polystyrene comprising one or more functional groups selected from the group comprising carboxylate, sulfonate, a carboxylic acid anhydride, phosphonate, and phosphinate; preferably carboxylate, sulfonate, or a carboxylic acid anhydride, most preferably carboxylate.

Suitable ionomers can be prepared by methods well known in the art such as, for example, as described in U.S. Pat. Nos. 3,264,272, 3,404,134, and 3,355,319, each of which is hereby incorporated by reference. Suitable commercially available ionomers include, but are not limited to, those known under the tradenames of Surlyn® (DuPont), EEA Copolymer (ethylene-ethyl acrylate copolymer), Hycar® (Goodrich), Iotek® (ExxonMobil), Priex® (Solvay Engineered Polymers), AClyn® (Honeywell International), Nafion® (DuPont), and Thionic® (Uniroyal). In an embodiment the at least one metallocene-catalyzed polyethylene resin is compounded with at least one ionomer, preferably said at least one resin is compounded with 0.2% to 10% by weight of at least one ionomer, more preferably from 0.5% to 7% by weight, preferably from 0.5% to 5% by weight, yet more preferably from 1.0% to 3.0% by weight relative to the total weight of the compounded resin.

The present invention also encompasses polymers, molded articles, membranes, adhesives, foams, sealants, films, extruded articles, fibers, elastomers, composite material, adhesives, organic LEDs, organic semiconductors, and conducting organic polymers, film casting, 3D printed articles, extrusion, comprising the metallocene-catalyzed polyethylene resin according to the present invention.

The present invention also encompasses an article comprising the metallocene-catalyzed polyethylene resin according to any of the embodiments previously described for the present invention.

In some embodiments, said article comprising metallocene-catalyzed polyethylene resin according to any of the embodiments previously described for the present invention is a shaped article.

In some embodiments, said shaped article comprising the metallocene-catalyzed polyethylene resin according to any of the embodiments previously described for the present invention is a molded article.

In an embodiment, said shaped article is produced by polymer processing techniques known to one of skill in the art, such as rotomolding, blow molding, injection molding, compression molding, film casting, 3D printing, extrusion, and thermoforming. Preferably, the shaped article is produced by rotomolding, blow molding, injection molding, or compression molding. Preferably the article is a rotomolded article.

Rotomolded articles include single and multilayered constructions in the form of bottles, tanks, large hollow articles, rigid food containers and toys, for example.

The articles obtained by rotomolding are generally hollow parts without any welding lines, such as tanks, drums, containers, bins, vats, jerrycans, cans, cisterns, boxes, bumpers, furniture (bath tubs), signs and ballards, planters, playground slides, car parts such as car doors, car bodies and car seats, airplane parts, nautical and aquatic equipment, buoys, floats, boards, planks and joints, boat or parts thereof, fibers, caps and closure, cast film, structural parts. In some embodiments, the rotomolded article is selected from the group comprising bottles, tanks, drums, containers, bins, vats, jerrycans, cans and cisterns, boat or parts thereof, floats, buoys, fibers, caps and closure, cast film, structural parts.

The present invention also encompasses a rotomolding process for preparing a rotomolded article according to the invention, comprising the steps of a) providing at least one metallocene-catalyzed polyethylene resin as described herein; and b) rotomolding said polyethylene resin into an article. The article can be a mono-layered article only having one layer, or it can be multilayered such as a bi-layered or tri-layered rotomolded article.

Rotational molding is a process well-known to the person skilled in the art. The various processes of rotational molding usually comprise the stages of a) loading of the mold; b) rotation of the mold; c) heating of the mold; d) cooling; and e) release from the mold.

The mold can be made of any material known in the art for such a purpose. For example, the mold can be an aluminum mold or a Teflon mold. Teflon molds are preferred to avoid any sticking to the mold due to the decreased shrinkage and warpage according to the article of the invention. The mold may be then loaded with powder and/or micropellets comprising the at least one metallocene-catalyzed polyethylene resin as described herein. The quantity of powder and/or of micropellets introduced into the mold depends on the size of the article and on the desired wall thickness. In some embodiments, the wall thickness of the article is of at least 2 mm to at most 25 mm when the article comprises one or more layers, or at least 500 µm to at most 25 mm when the comprises a monolayer (single layer).

The rotation of the mold can be generally carried out around two perpendicular axes. The heating step (c) of the mold occurs simultaneously with the rotation of the mold in step (b). In some embodiments, the heating step can be carried out in an oven or by electric heating elements. In some other preferred embodiments heating can be carried out with a mold heated by an oil-filled heating jacket, as in for example, the Leonardo® rotomolding machine from Persico®. The heating temperature of the oven, electric heating elements or oil can vary from 150° C. to 350° C., while the temperature of the air in the interior of the blow mold (peak internal air temperature) can vary from 205° C. to 215° C. One generally uses a temperature of at least of 10° C. higher, preferentially at least of 20° C. higher, more preferentially at least of 30° C. higher compared to the melting point of the layer that one wishes to mold In another embodiment, heating can also be carried out by microwaves.

The duration of the molding varies according to dimensions and the thickness of rotomolded article; it can range from 5 minutes to 600 minutes.

The duration and the time of cooling step depends on the installation, on the dimensions of the article to be molded and of the type of article which one wishes to obtain. As mentioned previously, it is possible to cool the mold and/or the article contained in the mold. To cool the mold from the outside, one can use air at room temperature, water between 5° C. and 25° C. or oil between 5° C. and 80° C. To cool the article from the inside of the mold, one can inject air and/or inert gas such as nitrogen and/or spray water (like a mist) within the interior of the mold, for example at a temperature of 25° C. The time of cooling generally varies between 5 minutes and 500 minutes depending on the thickness of the rotomolded article and the process used for cooling. When the article has a thickness of more than 10 mm, the mold can preferably be cooled from both the inside of the mold and the outside, preferably using Ar or inert gas such as nitrogen or a spray of water (mist).

According to a mode of realization, the cooling of the mold and/or article obtained can be done in just one step until a temperature ranging between room temperature and a temperature lower than 100° C. is obtained.

Thereafter, the article can be released from the mold. Release of the article from the mold can be generally carried out when the article has sufficient rigidity. The release from the mold can be generally done at a temperature lower than 100° C.

According to another mode of realization, the cooling of the mold and/or article obtained can be done in just one step until a temperature ranging between room temperature and a temperature lower than 100° C. is obtained.

According to another mode of realization, the cooling of the mold and/or article comprises the following steps:
i. cooling until a temperature ranging between 100° C. and 150° C., preferably between 100° C. and 130° C., is reached,
ii. maintaining this temperature for 1 minute to 60 minutes,
iii. cooling again until a temperature ranging between the room temperature and a temperature lower than 100° C. is reached.

Thereafter, the article can be released from the mold. Release of the article from the mold can be generally carried out when the article has sufficient rigidity.

The rotational molding can be carried out under inert gas in the absence of oxygen. In order to do so, one can for example add into the mold a compound which liberates carbon dioxide, such as dry ice. This can be for example together with the powder or pellets of the different components. Dry ice generates carbon dioxide during the heating and rotating steps of the molding process. One can also purge the mold with an inert gas, such as nitrogen, by injecting nitrogen after closing the mold.

The walls of the articles can comprise one or more successive layers, at least one of which comprises a metallocene-catalyzed polyethylene resin as described herein. It is thus possible to manufacture articles with walls comprising for example two or more layers.

There are several known methods to manufacture multilayered rotomolded articles: by manual introduction of material during the rotomolding cycle, or by the use of a drop-box, or by a one-shot system wherein each layer has a different melting temperature and are introduced into the mold together.

In some embodiments, manual addition involves moving the mold from the oven, removing a vent tube or plug that creates an opening in the part and adding more material using a funnel or wand. This operation can be repeated for each additional layer.

In some embodiments, a drop-box typically comprises the material for a particular layer and it is an insulated container that holds material until it is released at the appropriate time during the cycle.

The signal for release of material can be usually transmitted as a pressure pulse via the airline through the arm of the machine. The insulation can be kept cool to prevent the material inside the box from melting.

The present invention also discloses a method for rotomolding the articles according to the invention for one or more layers comprising the steps of (in no particular order) according to the process known to the skilled person:
a) feeding at least one metallocene-catalyzed polyethylene resin as described herein for a first layer into a mold;
b) placing the filled mold in pre-heated oven;
c) rotating the filled mold about two perpendicular axes;
d) optionally feeding a composition for a second layer;
e) optionally feeding a composition for a third layer, followed by repeating steps (b) and (c);
f) optionally feeding desired additional layers, each addition followed by repeating steps (b) and (c).
g) cooling and retrieving the rotomolded article Preferably, the process is carried out in the order described.

Articles obtained by the rotomolding process according to the invention do not have a point of weakness. They show homogeneous characteristics, such as for example a uniform thickness of the walls as well as very good surface aspects both internally and externally, without displaying any deformation, bubble or other defects. In addition, the resin for use in the process presents little or no sagging behavior during the rotomolding process. In particular, the articles obtained according to the present invention display low warpage, low sagging and low deformation. They also benefit from improved stiffness and rigidity; as well as good tensile properties.

The invention will now be illustrated by the following, non-limiting illustrations of particular embodiments of the invention.

EXAMPLES

Test Methods:

The density was measured according to the method of standard ASTM 1505 at a temperature of 23° C.

The melt index MI2 was measured according to the method of standard ISO 1133:1997, condition D, at 190° C. and under a load of 2.16 kg.

High load melt index HLMI was measured according to the method of standard ISO 1133:1997, condition G, at 190° C. and under a load of 21.6 kg.

The melt index MI5 was measured according to the method of standard ISO 1133:1997, condition T, at 190° C. and under a load of 5 kg.

The molecular weight ($M_n$ (number average molecular weight), $M_w$ (weight average molecular weight) and molecular weight distributions d (Mw/Mn), and d' (Mz/Mw) were determined by size exclusion chromatography (SEC) and in particular by gel permeation chromatography (GPC). Briefly, a GPC-IR5 from Polymer Char was used: 10 mg polyethylene sample was dissolved at 160° C. in 10 ml of trichlorobenzene for 1 hour. Injection volume: about 400 µl, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 ml/min. Detector: Infrared detector (2800-3000 cm$^{-1}$). Calibration: narrow standards of polystyrene (PS) (commercially available). Calculation of molecular weight Mi of each fraction i of eluted polyethylene is based on the Mark-Houwink relation ($\log_{10}(M_{PE})=0.965909\times\log_{10}(M_{PS})-0.28264$) (cut off on the low molecular weight end at $M_{PE}=1000$).

The molecular weight averages used in establishing molecular weight/property relationships are the number average ($M_n$), weight average ($M_w$) and z average ($M_z$) molecular weight. These averages are defined by the following expressions and are determined form the calculated $M_i$:

$$M_n = \frac{\Sigma_i N_i M_i}{\Sigma_i N_i} = \frac{\Sigma_i W_i}{\Sigma_i W_i/M_i} = \frac{\Sigma_i h_i}{\Sigma_i h_i/M_i}$$

$$M_w = \frac{\Sigma_i N_i M_i^2}{\Sigma_i N_i M_i} = \frac{\Sigma_i W_i M_i}{\Sigma_i W_i} = \frac{\Sigma_i h_i M_i}{\Sigma_i h_i}$$

$$M_z = \frac{\Sigma_i N_i M_i^3}{\Sigma_i N_i M_i^2} = \frac{\Sigma_i W_i M_i^2}{\Sigma_i W_i M_i} = \frac{\Sigma_i h_i M_i^2}{\Sigma_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

Rheology long chain branching index $g_{rheo}$ was measured according to the formula, as described in WO 2008/113680:

$$g_{rheo}(PE) = \frac{M_w(\text{SEC})}{M_w(\eta_0, MWD, SCB)}$$

wherein Mw (SEC) is the weight average molecular weight obtained from size exclusion chromatography expressed in kDa;

and wherein Mw ($\eta_0$, MWD, SCB) is determined according to the following, also expressed in kDa:

$M_w(\eta_0,\text{MWD,SCB})\exp(1.7789+0.199769 \text{ Ln } M_n+0.209026(\text{Ln } \eta_0)+0.955(\ln \rho)-0.007561(\text{Ln } M_z)(\text{Ln } \eta_0)+0.02355(\ln M_z)^2)$ wherein the zero shear viscosity η0 in Pa·s is obtained from a frequency sweep experiment combined with a creep experiment, in order to extend the frequency range to values down to 10$^{-4}$ s$^{-1}$ or lower, and taking the usual assumption of equivalence of angular frequency (rad/s) and shear rate; wherein zero shear viscosity η0 is estimated by fitting with Carreau-Yasuda flow curve (η-W) at a temperature of 190° C., obtained by oscillatory shear rheology on ARES-G2 equipment (manufactured by TA Instruments) in the linear viscoelasticity domain; wherein circular frequency (W in rad/s) varies from 0.05-0.1 rad/s to 250-500 rad/s, typically 0.1 to 250 rad/s, and the shear strain is typically 10%. In practice, the creep experiment is carried out at a temperature of 190° C. under nitrogen atmosphere with a stress level such that after 1200 s the total strain is less than 20%; wherein the apparatus used is an AR-G2 manufactured by TA instruments.

The TREF analysis was performed on a TREF model 200 series instrument equipped with Infrared detector from Polymer Char. The samples were dissolved in 1,2-dichlorobenzene at 150° C. for 1 h. The following parameters as shown in Table A were used.

TABLE A

| METHOD INFORMATION | |
|---|---|
| Dissolution Rate (° C./min) | 40 |
| Stabilization Rate (° C./min) | 40 |
| Crystallization Rate 1 (° C./min) | 0.5 |
| Elution Rate (° C./min) | 1 |
| Cleaning rate (° C./min) | 30 |
| Dissolution temperature (° C.) | 150 |
| Stabilization temperature (° C.) | 95 |
| Crystallization temperature (° C.) | 35 |
| Elution init temp (° C.) | 35 |
| Elution temperature (° C.) | 140 |
| Post elution temperature (° C.) | 150 |
| Cleaning temperature (° C.) | 150 |
| Dissolution time (min) | 60 |
| Stabilization time (min) | 45 |
| Crystallization time (min) | 10 |
| Pre-injection time (min) | 10 |
| Soluble Fraction time (min) | 10 |
| post elution time (min) | 10 |
| High rpm | 200 |
| Low rpm | 100 |
| T on (s) | 5 |
| T off (s) | 120 |
| Dissolution stirring | High |
| Stabilization stirring | High |
| Filling vessels volume (ml) | 20 |
| Filling vessels pick up speed (ml/min) | 40 |
| Filling vessels pump speed (ml/min) | 15 |
| Analysis discarded sample volume (ml) | 2 |
| Analysis discarded waste volume (ml) | 6 |
| Analysis sample volume (ml) | 0.3 |
| Column load volume (ml) | 1.9 |
| Analysis waste volume (ml) | 5 |
| Analysis returned volume (ml) | 1 |

TABLE A-continued

METHOD INFORMATION

| | |
|---|---|
| Analysis pick up rate (ml/min) | 8 |
| Analysis dispensing rate (ml/min) | 3 |
| Cleaning volume (ml) | 30 |
| Cleaning pick up speed (ml/min) | 40 |
| Cleaning pump speed (ml/min) | 15 |
| Top oven temperature (° C.) | 140 |
| Pump Flow (ml/min) | 0.5 |

Dynamic rheometry analyses (RDA) were performed on an ARES rheometer from TA Instruments (Waters SA), measured on parallel plates with a diameter of 25 mm. Temperature was 190° C., deformation was 10%, and the scanning frequency was from 0.1 to 300 rad/s.

ESCR was measured according to ASTM D 1693-method B at 50° C. using 10% Igepal CO-630 as a chemical agent (wherein Igepal CO-630 (CAS Number 68412-54-4) is commercially available from Rhodia), or ASTM D 1693-method A at 50° C. using 100% Igepal CO-630.

Tensile modulus was measured according to ISO 527-2.

Determination of the shrinkage/warpage of the molded object: The measurement of the rotomolded article compared to the mold itself was done by three-dimensional analysis according to the method described in international patent application published WO 2008/151988. In brief the method comprises the steps of: a) subjecting the external surface of the rotomolded part to three-dimensional analysis by optical digitization; b) subjecting the internal surface of the mold to three-dimensional analysis by optical digitization; c) keying the molded part into the mold; d) mapping the volume between mold and molded part point by point; e) creating a bank of maps using different resins; f) creating a bank of maps using different oven temperatures; g) creating a bank of maps using different cooling rates; h) selecting the parameters of steps i) and/or j) and/or k) that give the best balance of deformations. Digital geometry processing is used to generate a three-dimensional image of the inside of an object from a large series of two-dimensional images taken around a single axis of rotation.—A fixed point of the molded part is keyed to the mold.

Example 1: Preparation of Resins

Polyethylene resins: four resins according to the invention (Resins 1, 2, 3, and 4) having bimodal molecular weight distribution were prepared in two serially connected slurry loop reactors (double loop reactor) under the conditions given below in Table 1. The polyethylene resins (Resins 1, 2, 3, and 4) were prepared with dimethylated ethylene bis(tetrahydroindenyl) zirconium, methylalumoxane (MAO) supported catalyst. The silica support was sold by PQ Corporation under the name ES70W. It had the following specifications: specific surface area=291 $m^2/g$; D50=40 μm; porous volume=1.63 ml/g; and span=1.62. The supported metallocene-MAO-catalyst comprised 30% in weight of MAO (sold by Albemarle) and 2% in weight of metallocene.

Pelletization was performed on a ZSK58 twin screw extruder.

TABLE 1 operating conditions and analytical results for each of the resins

| | | | Resin 1 | Resin 2 | Resin 3 | Resin 4 |
|---|---|---|---|---|---|---|
| First reactor operating conditions | Temperature | (° C.) | 90 | 90 | 90 | 90 |
| | ethylene | (kg/h) | 19.0 | 19.0 | 19.0 | 19.0 |
| | 1-hexene | (kg/h) | 0.0 | 0.0 | 0.0 | 0.0 |
| | $H_2$ | (Nl/h) | 30.0 | 37.1 | 33.3 | 34.0 |
| | Isobutane | (kg/h) | 50 | 50 | 50 | 50 |
| First reactor Analytical results | MI2 | (g/10 min) | 49.1 | 94.8 | 50.2 | 55.9 |
| | Density | (g/cm$^3$) | 0.9664 | 0.9702 | 0.9721 | 0.9692 |
| CONTRIBUTION | First reactor | (wt %) | 40.6 | 40.6 | 40.4 | 40.9 |
| Second reactor Operating conditions | Temperature | (° C.) | 83.0 | 83.0 | 83.0 | 83.0 |
| | ethylene | (kg/h) | 27.0 | 27.0 | 27.0 | 27.0 |
| | 1-hexene | (Kg/h) | 4.2 | 4.5 | 5.0 | 3.9 |
| | $H_2$ | (Nl/h) | 19.0 | 17.5 | 14.7 | 15.2 |
| | Isobutane | (kg/h) | 45 | 45 | 45 | 45 |
| Second Reactor Analytical Results | MI2 | (g/10 min) | 6.3 | 6.8 | 4.6 | 4.8 |
| | MI5 | (g/10 min) | 18.5 | 20.0 | 13.8 | 14.5 |
| | HLMI | (g/10 min) | 165 | 190 | 111 | 120 |
| | SR2 | | 26 | 28 | 24 | 25 |
| | SR5 | | 9 | 10 | 8 | 8 |
| | Density | (g/cm$^3$) | 0.9449 | 0.9449 | 0.9454 | 0.9468 |
| Density: D1 fraction made in 1$^{st}$ reactor | 1$^{st}$ reactor | (g/cm$^3$) | 0.9664 | 0.9702 | 0.9721 | 0.9692 |
| Density: final fluff | | (g/cm$^3$) | 0.9449 | 0.9449 | 0.9454 | 0.9468 |
| Calculated density: D2 fraction made in 2$^{nd}$ rector | Fraction made in 2$^{nd}$ reactor | (g/cm$^3$) | 0.9301 | 0.9276 | 0.9273 | 0.9313 |
| Delta density | D1-D2 | (g/cm$^3$) | 0.0215 | 0.0253 | 0.0267 | 0.0224 |
| Calculated MI2 | Fraction made in 2nd reactor | (g/10 min) | 1.56 | 1.13 | 0.91 | 0.88 |
| PELLETS | MI2 | (g/10 min) | 5.15 | 5.09 | 3.99 | 4.03 |
| | MI5 | (g/10 min) | 15.3 | 15.2 | 12.0 | 12.2 |
| | HLMI | (g/10 min) | 140 | 148 | 104 | 103 |
| | SR2 | | 27 | 29 | 26 | 26 |
| | Density | (g/cm$^3$) | 0.9438 | 0.9435 | 0.9448 | 0.9481 |
| GPC FINAL PELLETS | Mn | (Da) | 17868 | 16943 | 18443 | 18523 |
| | Mw | (Da) | 56815 | 58106 | 59836 | 58616 |
| | Mz | (Da) | 117088 | 124796 | 126250 | 118633 |
| | D | | 3.2 | 3.4 | 3.2 | 3.2 |
| | D' | | 2.1 | 2.1 | 2.1 | 2.0 |

TABLE 1-continued operating conditions and analytical results for each of the resins

|  |  | Resin 1 | Resin 2 | Resin 3 | Resin 4 |
|---|---|---|---|---|---|
| RDA | ghreo | 0.91 | 0.92 | 0.87 | 0.87 |
| FINAL FLUFF | SR/MWD (~LCB) | 8.2 | 8.2 | 7.6 | 7.8 |

Example 2: TREF Analysis

Figure 2:
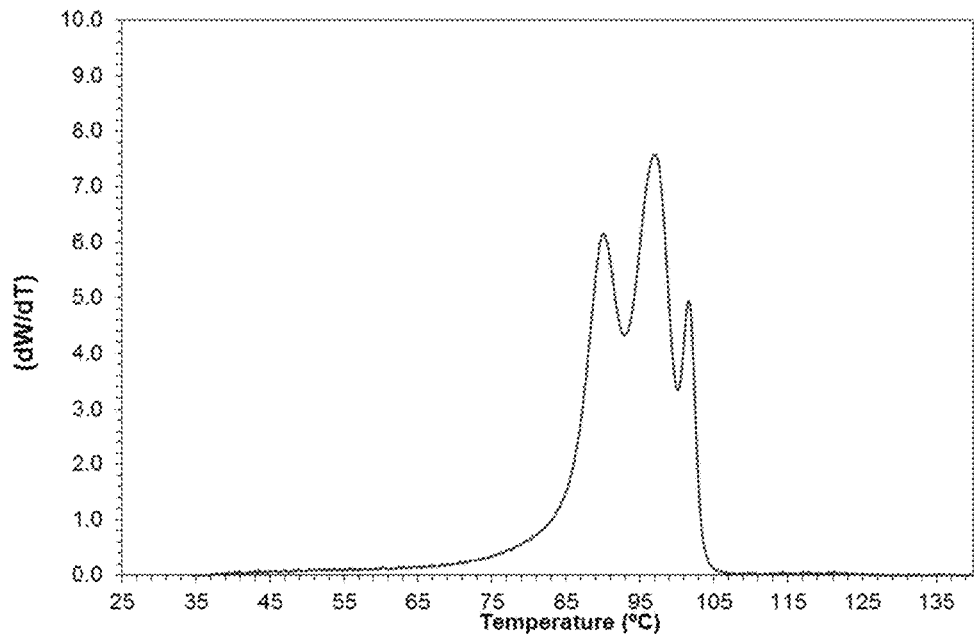
FIG. 2 represents a graph plotting a TREF (temperature rising elution fractionation) profile (dW/dT (%/° C.)) as a function of temperature for polyethylene resin 2 according to an embodiment of the present invention.

Resins 1 and 2 were fractionated according to their chemical compositions by a Temperature Rising Elution Fractionation (TREF) process. The results are shown in FIGS. 1 and 2. FIG. 1 shows the TREF distribution profile of Resin 1, while FIG. 2 shows the TREF distribution profile of Resin 2. Table 2 shows the percentages of the polyethylene resin 1, and polyethylene 2 that elutes at a given temperature, in % by weight.

TABLE 2

| Temperature (° C.) | Resin 1 (wt % eluted) | Resin 2 (wt % eluted) |
|---|---|---|
| 40.00 | 0.90 | 0.43 |
| 50.00 | 1.75 | 1.09 |
| 60.00 | 2.82 | 2.15 |
| 70.00 | 4.29 | 3.71 |
| 80.00 | 7.69 | 7.50 |
| 85.00 | 12.21 | 12.45 |
| 87.00 | 15.42 | 16.72 |
| 90.00 | 24.80 | 31.11 |
| 93.00 | 38.56 | 46.40 |
| 94.00 | 43.47 | 51.01 |
| 95.00 | 49.48 | 56.52 |
| 96.00 | 56.94 | 63.31 |
| 97.00 | 65.27 | 70.67 |
| 98.00 | 73.45 | 78.09 |
| 99.00 | 79.98 | 83.55 |
| 100.00 | 84.30 | 87.32 |

TABLE 2-continued

| Temperature (° C.) | Resin 1 (wt % eluted) | Resin 2 (wt % eluted) |
|---|---|---|
| 101.00 | 88.40 | 91.11 |
| 102.00 | 94.00 | 95.81 |
| 103.00 | 97.84 | 98.42 |
| 104.00 | 98.85 | 99.03 |
| 105.00 | 99.12 | 99.22 |
| 106.00 | 99.22 | 99.30 |
| 107.00 | 99.28 | 99.35 |
| 108.00 | 99.33 | 99.39 |
| 109.00 | 99.39 | 99.42 |
| 110.00 | 99.43 | 99.45 |
| 115.00 | 99.57 | 99.61 |
| 120.00 | 99.71 | 99.79 |
| 125.00 | 99.87 | 99.97 |
| 130.00 | 99.94 | 99.99 |
| 135.00 | 100.00 | 100.00 |

For each of the polymers tested, the temperature of each of the peaks observed in the TREF distribution curves, the percentage of the area under said peaks are displayed in Table 3.

TABLE 3

|  | Peak 1 | | Peak 2 | | Peak 3 | |
|---|---|---|---|---|---|---|
|  | Temp ° C. | Area (%) | Temp ° C. | Area (%) | Temp ° C. | Area (%) |
| Resin 1 | 91.5 | 32.1 | 96.9 | 55.2 | 101.4 | 15.1 |
| Resin 2 | 90.0 | 44.2 | 96.7 | 43.3 | 101.2 | 12.2 |

Example 3

Resins as prepared in Example 1 were compounded in a twin screw extruder (Werner & Pfleiderer ZSK 58). The temperature profile along the extruder barrel was 180° C., and the temperature of the die was 210° C. The screw speed was 200 rpm, the residence time of 0.5 min, and the number of passes was 1. The compounded resin compositions are shown in Table 4, wherein Surlyn®1650E (commercially available from Du Pont) Surlyn® 1650 E is a zinc ionomer, more particularly a copolymer of ethylene and methacrylic acid.

TABLE 4

|  | P 130 | P 131 | P 130b | P 131b | P 132 | P 133 |
|---|---|---|---|---|---|---|
| Resin | 1 | 2 | 1 | 2 | 3 | 4 |
| Surlyn ®1650E | / | / | 1 weight % | 1 weight % | 1 weight % | 1 weight % |

Figure 3:
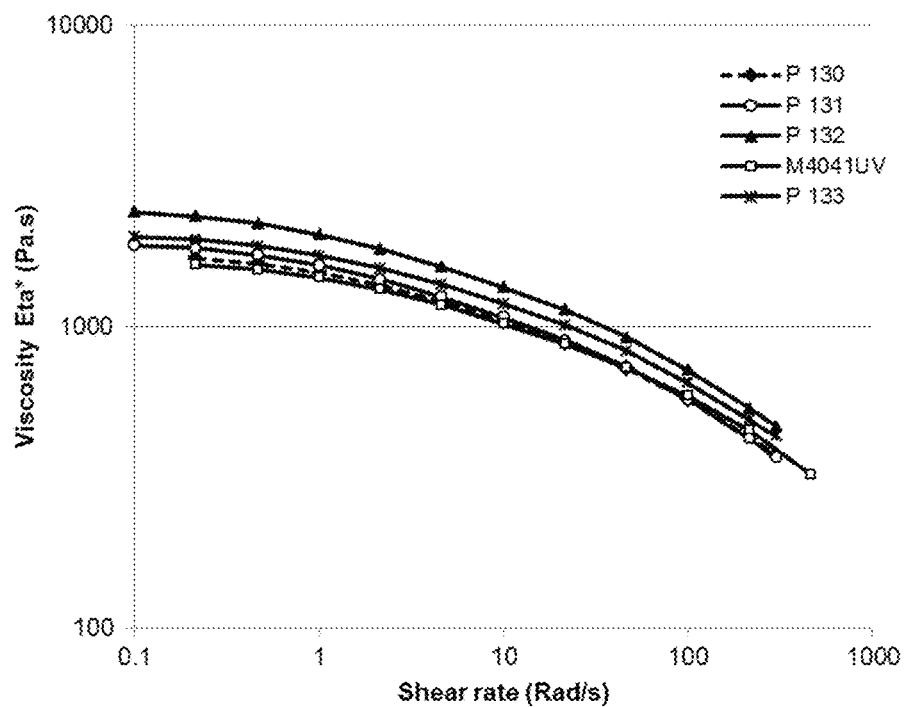
FIG. 3 represents a rheometric dynamic analysis ("RDA") graph plotting viscosity as a function of shear rate for four different polyethylene resins according to embodiments of the present invention, and a comparative example.
Figure 4:
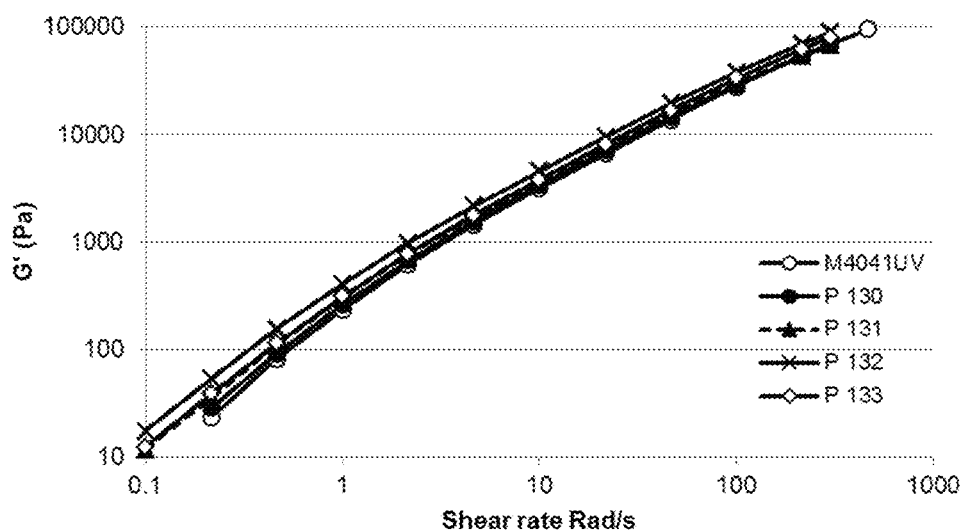
FIG. 4 represents a rheometric dynamic analysis ("RDA") graph plotting storage modulus (G') as a function of shear rate for four different polyethylene resins according to embodiments of the present invention, and a comparative example.

Compression molded samples of the compounded resins were analyzed. ESCR and RDA analyses were performed and compared with the results obtained when using a commercially-available rotomolding-grade metallocene-catalyzed monomodal polyethylene resin Lumicene® mPE M 4041 UV from Total Refining & Chemicals, having an MI2 (ISO 1133/D 2.16 kg-190° C.) of 4 g/10 min, and a density of 0.940 g/cm$^3$ (ISO 1183). The results are shown in FIG. 3, which plots viscosity (Pa·s) of each resin as a function of shear rate (Rad/s); and in FIG. 4, which shows the plot of the storage modulus (G') of each resin as a function of shear rate (Rad/s), and in Table 5.

TABLE 5

|  | M4041UV | P 130 | P 131 | P 132 | P 133 |
|---|---|---|---|---|---|
| ESCR 10% Igepal CO 630 (in hours) | <100 | 654 | >1000 | 120 | 18 |
| ESCR 100% Igepal CO 630 (in hours) | 70 |  | >1000 |  |  |
| Tensile Modulus (MPa) | 665 | 821 | 826 | 782 | 841 |

Example 4: Rotomolded Bottles

Rotomolded bottles were manufactured using the following materials, which were ground into rotomolding powder (average particle size 300 μm) using as pulverizing system ULTRA Dual Mill from Reduction Engineering Scheer:

- P130: prepared as described in Example 3.
- P130b: prepared as described in Example 3.
- P131: prepared as described in Example 3.
- P131b: prepared as described in Example 3.
- P132: prepared as described in Example 3.
- P133: prepared as described in Example 3.
- Lumicene® mPE M4043 UV from Total Refining & Chemicals available in powder form: This metallocene-catalyzed monomodal polyethylene has a density of 0.940 g/cm$^3$ (ISO 1183) and melt index MI2 of 4.0 g/10 min (ISO 1133 condition D under a load of 2.16 kg at 190° C.). The tensile modulus was around 650 MPa measured according to ISO 527-1B.
- Lumicene® mPE M 4041 UV from Total Refining & Chemicals: This metallocene-catalyzed monomodal polyethylene has a density of 0.940 g/cm$^3$ (ISO 1183) and melt index MI2 of 4.0 g/10 min (ISO 1133 condition D under a load of 2.16 kg at 190° C.). The polyethylene powders were obtained after grinding the polyethylene pellets. The average particle size of the powder after grinding was of 300 μm.
- Lumicene® mPE M 3421 UV from Total Refining & Chemicals: This metallocene-catalyzed polyethylene has a density of 0.935 g/cm$^3$ (ISO 1183) and melt index MI2 of 2.7 g/10 min (ISO 1133 condition D under a load of 2.16 kg at 190° C.). The tensile modulus was around 590 MPa measured according to ISO 527-1B. The polyethylene powders were obtained after grinding the polyethylene pellets. The average particle size of the powder after grinding was of 300 μm.

The samples were evaluated on 7 L bottles prepared by rotomolding using a commercial rotomolding equipment. Peak Internal Air Temperature (PIAT) was 210° C. in all cases.

A carousel oven machine was used, with Teflon-coated Aluminum molds. Cooling of the molds was obtained via external air cooling only. Air was used at room temperature (between 20° C. to 25° C.). For each bottle, resin powder was loaded in the mold, followed by manufacturing the bottle by rotational molding.

The parameters of the cycle were the following:
Heating of the oven to a temperature of about 310° C.;
PIAT (peak internal air temperature): about 210° C.;
Thickness of bottles: 4.5 mm;
Removed from the oven at 200° C. (internal air temperature).

The densification (bubble removal) during the rotomolding cycle was assessed. Densification and bubble formation has been discussed by Kontopoulo et al. (M. Kontopoulo, E. Takacs, J. Vlachopoulos, Rotation, 28, January 2000). During melting air pockets or bubbles are trapped, thus delaying the formation of a homogeneous melt and also affecting the aesthetical and/or mechanical properties of the finished product.

A charge-coupled device (CCD) camera was used to characterize the properties of polyethylene resin during densification. Characterization of the processing behavior was analyzed using a megapixel progressive scan interline CCD with on-chip circuits commercially available from Kodak. Its characteristics are given in Table 6.

TABLE 6

| | |
|---|---|
| architecture: | interline CCD, progressive scan, non-interlaced |
| pixel count: | 1000 (H) × 1000 (V) |
| pixel size: | 7.4 μm (H) × 7.4 μm (V) |
| photosensitive area: | 7.4 mm (H) × 7.4 mm (V) |
| output sensitivity: | 12 μV/electron |
| saturation signal: | 40,000 electrons |
| dark noise: | 40 electrons rms |
| dark current (typical): | <0.5 nA/cm$^2$ |
| dynamic range: | 60 dB |
| quantum efficiency at 500, 540, 600 nm: | 36%, 33%, 26% |
| blooming suspension: | 100X |
| image lag: | <10 electrons |
| smear: | <0.03% |
| maximum data rate: | 40 MHz/channel (2 channels) |
| integrated vertical clock drivers | |
| integrated correlated double sampling (CDS) | |
| integrated electronic shutter driver | |

The high performance 15-bit (16 bits minus 1 bit for control) CCD sensor with transparent gate electrode provided 32,768 unsigned levels of gray, allowed the acquisition of about 10,000 frames/s and covers a broad spectrum of from 400 nm to 1000 nm.

The progressive disappearance of bubbles as a function of time and temperature is clearly and instantaneously followed. In addition to the visual aspect, the computer instantaneously produces a set of parameters resulting from picture analysis and allows to plot a graph as shown in FIG. 5.

Figure 5:
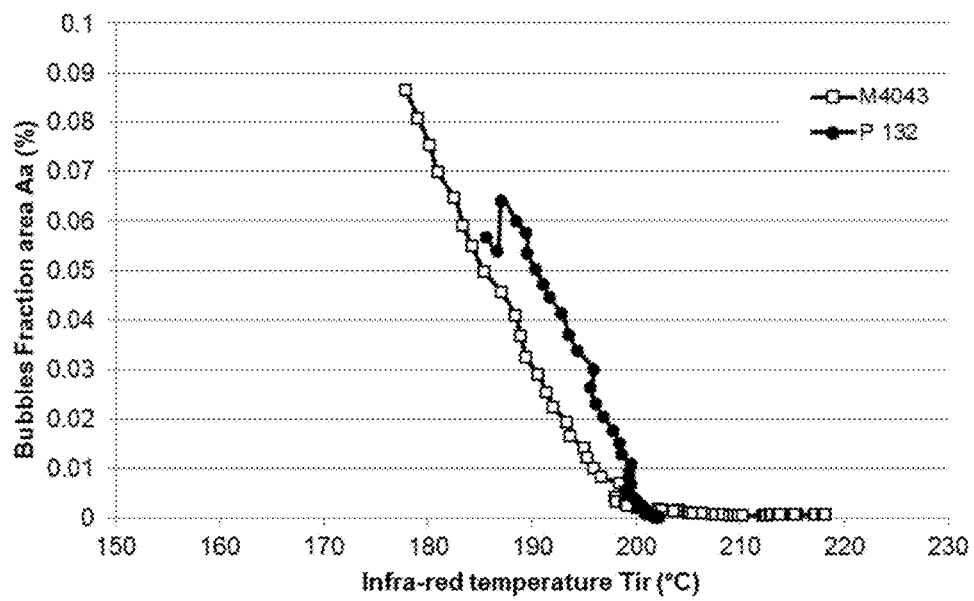
FIG. 5 represents a graph plotting the percentage of total picture area covered by bubbles (Aa, in %) as a function of the infra-red temperature of the sample (Tir, in ° C.) for rotomolded articles prepared with a polyethylene resin according to embodiments of the present invention, and a comparative example.

FIG. 5 shows the percentage of total picture area covered by bubbles (Aa, in %) as a function of the infra-red temperature of the sample (Tir, in ° C.). Using the polyethylene according to the invention, rotomolded articles with a low number of bubbles could be obtained.

3D shrinkage: The 3D shrinkage was evaluated following the method described in WO 2008/151988. 3D shrinkage was assessed using a mold of 7 liters in volume. This mold was used on a Ferry Carousel machines (Standard oven type). A 3D optical scanning was made of the inner surface of the mold. A 3D optical scan was made of the rotomolded article and a best fit calculation was done to compare the mold and the article. The rotomolded article and the mold have been scanned: Approximately 330000 points of comparison were carried out on both the article and the mold. A design of experiment (DOE) was performed to obtain the correlation between material, processing conditions and 3D volume properties of rotomolded articles. This DOE was used to calculate 3D "shrinkage". The average 3D deviation was used calculate the 3D shrinkage with the equation:

$$y(\% \text{ shrinkage}) = -1.2298103 + -2.9087107 \times (\text{Avg 3D deviation})$$

Figure 6:
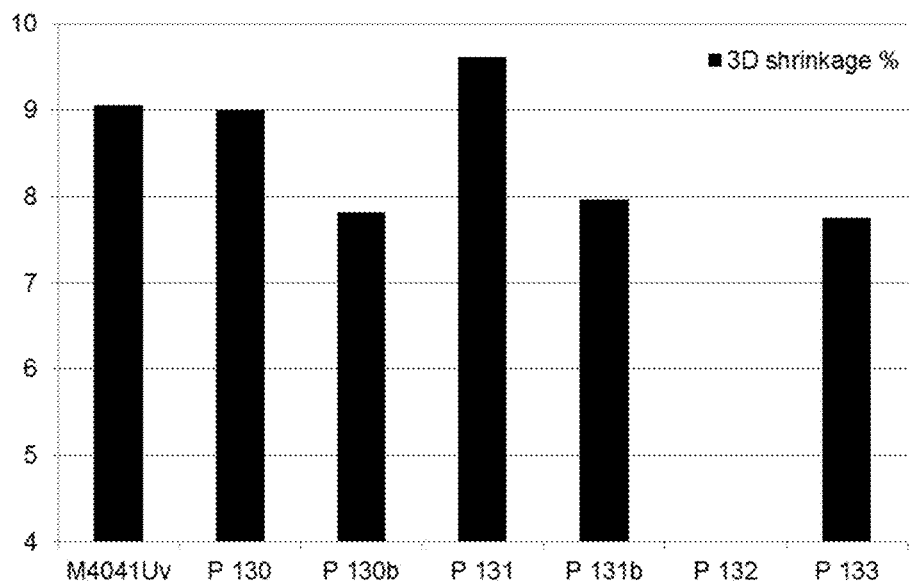
FIG. 6 represents a graph plotting the % of 3D shrinkage of rotomolded bottles comprising either a polyethylene resins according to embodiments of the invention or a comparative resin.
Figure 7:
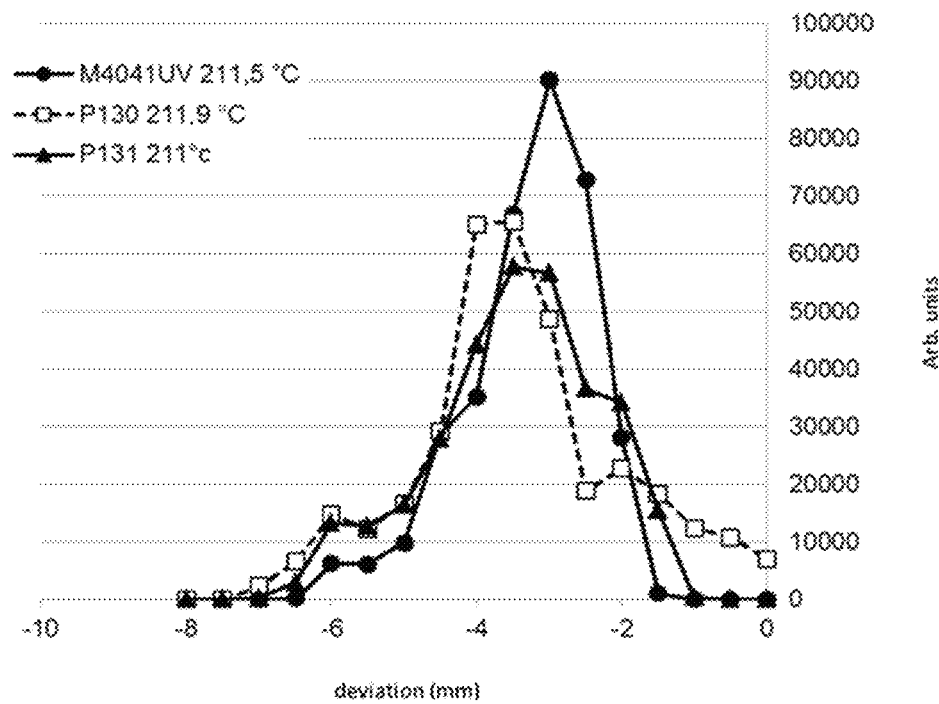
FIG. 7 represents a graph potting the level of shrinkage of rotomolded bottles comprising either polyethylene resins according to embodiments of the invention or a comparative resin.

The results are presented in FIGS. 6 and 7. In FIG. 7, the abscissa x shows the difference in mm (deviation) between the mold and the molded article. The more important the deviation is, the more deformed is the article. The ordinate is given as arbitrary units (arb. units) and represent the number of points per class of deviation.

Figure 8:
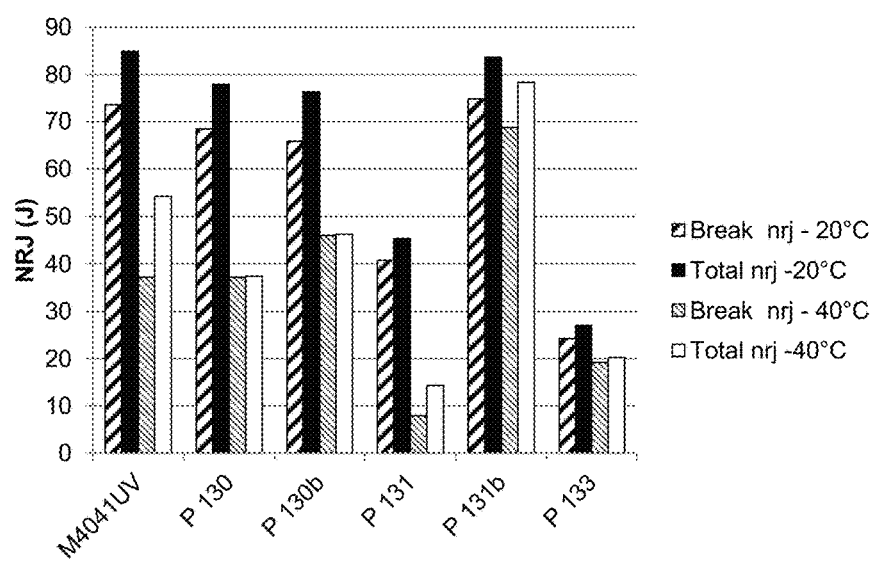
FIG. 8 represents a graph plotting the break energy (J) and the total energy (J) at −20° C. and −40° C., of rotomolded bottles comprising either a polyethylene resins according to embodiments of the invention or a comparative resin.

The impact properties of the rotomolded articles were measured using the method of standard test ISO 6603-2 at a temperature of −20° C. and −40° C. They were tested for impact using the method of standard test ISO 6603-2. This is a falling weight test that gives the resistance to shock. The tests were carried out respectively at temperatures of −20° C. and −40° C., a speed of the falling mass of 4.43 m/s. The test results were obtained on an average of at least 5 samples. Modes of failure during impact testing fall into two categories: brittle and ductile. With brittle failure, a crack initiates and propagates prior to any bulk yielding of the specimen and hence the point of failure lies on the initial rising portion of the load/deformation curve. In the case of ductile failure, considerable yielding takes place and the failure occurs well after the maximum on the load/deformation curve. As the area under the load/deformation curve is a measure of the fracture energy, it follows that brittle failure is associated with very low absorbed energy as compared to ductile failure. The ductility index is defined by the ratio Eprop/Etot, in % (i.e. (Eprop/Etot)*100), wherein total energy Etot is the sum of peak energy Epeak and propagation energy Eprop. The samples used for impact tests were all taken from the same side of each trial molding so that the results were made comparable to the molding conditions. They were cut with a bandsaw into squares of 65 mm×65 mm, the edges were cleaned of burrs and the thickness at the center of each sample was noted. The machine used was the CEAST Fractovis. The impact results recorded are reported in Table 7 and in FIG. 8.

TABLE 7

| Sample | Temperature °C. | Energy to Peak Load (J) | Total energy (J) | Ductility index (%) |
|---|---|---|---|---|
| M4041UV | −20 | 53.08 | 84.87 | 27.8 |
| M4041UV | −40 | 39.00 | 54.22 | 16.7 |
| P130 | −20 | 49.22 | 77.81 | 28.1 |
| P130 | −40 | 36.14 | 37.39 | 2.8 |
| P130b | −20 | 46.27 | 76.28 | 29.8 |
| P130b | −40 | 44.04 | 46.24 | 4.1 |
| P131 | −20 | 35.39 | 45.33 | 13.3 |
| P131 | −40 | 7.48 | 14.21 | 6.3 |
| P131b | −20 | 50.53 | 83.65 | 32.4 |
| P131b | −40 | 53.23 | 78.27 | 19.2 |
| P133 | −20 | 16.40 | 24.24 | 31.5 |
| P133 | −40 | 13.50 | 20.27 | 22.0 |

The tensile properties of the bottles were measured according to ASTM D638 at 23° C., 40° C. and 80° C., and deformation rate of $10^{-3}$ $s^{-1}$, using a video traction apparatus. The longitudinal and transversal deformations were measured; each essay was repeated 6 times. Table 8 depicts the results of this test.

TABLE 8

| | M3421UV | BOPP130 | | | M4041UV | | |
|---|---|---|---|---|---|---|---|
| Temperature (° C.) | 23 | 23 | 40 | 80 | 23 | 40 | 80 |
| E (MPa) | 760 | 1305 | 710 | 240 | 806 | 369 | 84 |
| v | 0.4 | 0.437 | 0.466 | 0.453 | 0.442 | 0.443 | 0.445 |
| Threshold (MPa) | 4.00 | 6.45 | 3 | 1.4 | 4 | 2 | 1 |
| Stress at break (MPa) | >50 | >40 | >30 | >20 | >50 | >20 | >15 |
| True deformation at break (%) | >100 | >100 | >100 | >100 | >100 | >60 | >60 |

The next step consisted in determining the ideal thickness, weight of material to use in an unanchored cylindrical liquid storage tank with a height of 3677 mm and a diameter of 2340 mm, capable of resisting a maximal hydrostatic pressure of 0.0535 MPa when at 99% full capacity at room temperature (23° C.). The tests were conducted using Abacus® software, wherein the data from Table 8 were used to calculate the maximal Von Misses stress and the maximal displacement of the base of a tank (settlement) to assess the possibility of irreversible deformation (plastic deformation) of the tank. The modeling was performed on ¼ of the tank, since the tank was considered to be symmetrical on both the x and the y axes. The maximal displacement was on both the external (radial) and the internal (axial) surfaces of the tank; while the Von Misses stress was calculated at both the internal and external surfaces of the tank.

The results of the calculations performed with P 130 are depicted in Table 9. The results of the calculations performed with M4041UV are depicted in Table 10. The results of the calculations performed with M3421UV are depicted in Table 11.

TABLE 9

| Tank dimensions | | Maximal displacement (mm) | | Maximal Von Misses stress ($\sigma_{VM}$) (MPa) | |
|---|---|---|---|---|---|
| Thickness (mm) | Weight (Kg) | Radial | Axial | Internal surface | External surface |
| 10 | 324.31 | −5.67 | −16.97 | 6.42$^P$ | 6.37 |
| 12 | 389.18 | −4.67 | −13.01 | 5.68 | 5.22 |
| 14 | 454.04 | −3.97 | −10.24 | 4.79 | 4.40 |
| 16 | 518.90 | −3.45 | −8.30 | 4.12 | 3.82 |
| 18 | 583.76 | −3.05 | −6.91 | 3.62 | 3.38 |

$^P$Plastic deformation.

TABLE 10

| Tank dimensions | | Maximal displacement (mm) | | Maximal Von Misses stress ($\sigma_{VM}$) (MPa) | |
|---|---|---|---|---|---|
| Thickness (mm) | Weight (Kg) | Radial | Axial | Internal surface | External surface |
| 12 | 387.53 | −7.6 | −20.61 | 5.67$^P$ | 5.26$^P$ |
| 14 | 452.12 | −6.46 | −16.53 | 4.83 | 4.42 |
| 16 | 516.70 | −5.60 | −13.49 | 4.16 | 3.83 |
| 18 | 581.29 | −4.95 | −11.25 | 3.65 | 3.39 |
| 20 | 645.88 | −4.42 | −9.57 | 3.25 | 3.03 |
| 22 | 710.47 | −4.00 | −8.28 | 2.92 | 2.74 |

$^P$Plastic deformation.

TABLE 11

| Tank dimensions | | Maximal displacement (mm) | | Maximal Von Misses stress ($\sigma_{VM}$) (MPa) | |
|---|---|---|---|---|---|
| Thickness (mm) | Weight (Kg) | Radial | Axial | Internal surface | External surface |
| 14 | 449.23 | −7.17 | −17.23 | 4.54$^P$ | 4.35$^P$ |
| 16 | 513.40 | −5.95 | −14.01 | 4.05$^P$ | 3.82 |
| 18 | 577.58 | −5.26 | −11.66 | 3.58 | 3.37 |

TABLE 11-continued

| Tank dimensions | | Maximal displacement (mm) | | Maximal Von Mises stress ($\sigma_{VM}$) (MPa) | |
|---|---|---|---|---|---|
| Thickness (mm) | Weight (Kg) | Radial | Axial | Internal surface | External surface |
| 20 | 641.76 | −4.69 | −9.90 | 3.19 | 3.01 |
| 22 | 705.93 | −4.25 | −8.55 | 2.86 | 2.73 |

$^P$Plastic deformation.

Figure 9:
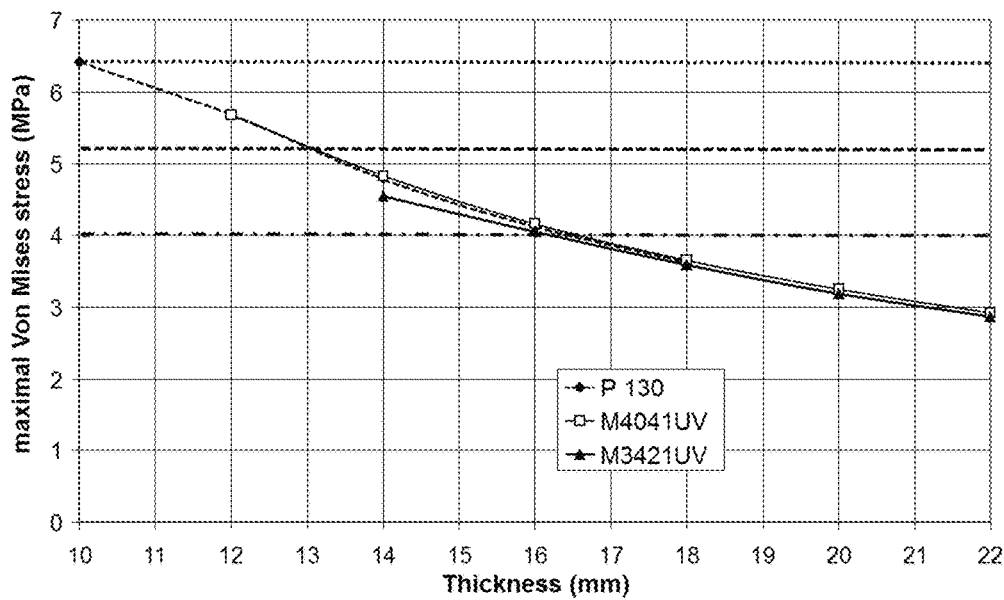
FIG. 9 represents a graph plotting the maximal Von Mises stress (MPa) at the external surface of the tank in function of the thickness of the tank; for a tank comprising either a polyethylene resin according to the invention, or comparative resins. The horizontal dash lines represent the threshold for each resin.
Figure 10:
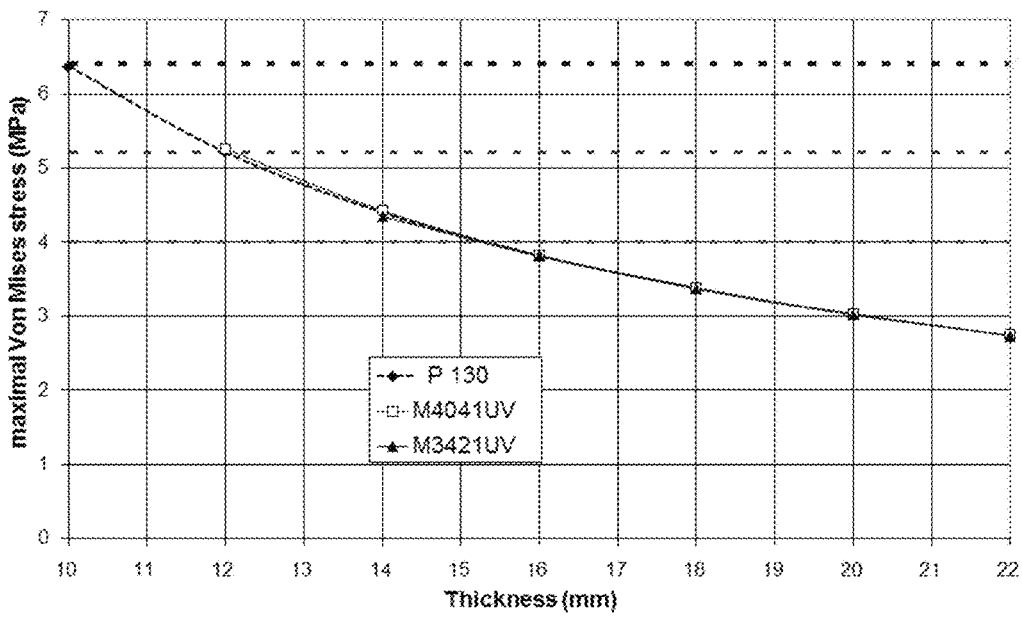
FIG. 10 represents a graph plotting the maximal Von Mises stress (MPa) at the internal surface of the tank in function of the thickness of the tank; for a tank comprising either a polyethylene resin according to the invention, or comparative resins. The horizontal dash lines represent the threshold for each resin.

The calculated maximal Von Mises stress was then potted in function of the thickness of the tank, for both the internal (FIG. 9) and the external (FIG. 10) surfaces of the tank. The dotted lines on FIGS. 9 and 10 indicate the threshold for each of the polymeric materials. These figures show that a tank comprising a polyethylene resin according to the invention has the highest threshold.

Figure 11:
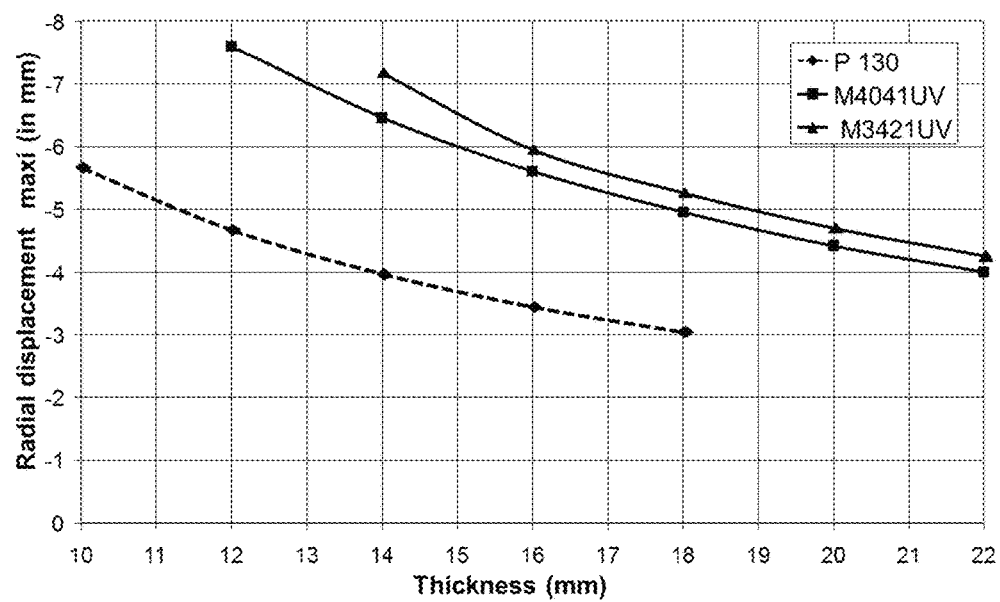
FIG. 11 represents a graph plotting the radial maximal displacement (MPa) of the tank in function of the thickness of the tank; for a tank comprising either a polyethylene resin according to the invention, or comparative resins.

The calculated radial maximal displacement was also potted in function of the thickness of the tank (FIG. 11). From figure is possible to determine that the tank comprising a polyethylene resin according to the invention is the less rigid. Table 13 shows the maximal displacement and maximal Von Mises stress for each of the tested samples.

TABLE 13

| | container dimensions | | Maximal displacement (mm) | | Maximal Von Mises stress ($\sigma_{VM}$) (MPa) | |
|---|---|---|---|---|---|---|
| Sample | Thickness (mm) | Weight (Kg) | Radial | Axial | Internal surface | External surface |
| BOPP130 | 11 | 356.74 | −5.11 | −14.82 | 6.25 | 5.80 |
| M4041UV | 14 | 452.12 | −6.46 | −16.53 | 4.83 | 4.42 |
| M3421UV | 17 | 516.70 | −5.59 | −12.75 | 3.82 | 3.58 |

The invention claimed is:

1. A metallocene-catalyzed polyethylene resin comprising at least two metallocene-catalyzed polyethylene fractions A and B, wherein the polyethylene resin comprises:
   at least 25% to at most 42% by weight of polyethylene fraction A based on the total weight of the polyethylene resin, wherein fraction A has a melt index MI2 of at least 25.0 g/10 min as determined according to ISO 1133, condition D, at 190° C. and under a load of 2.16 kg, and a density at least 0.005 g/cm³ higher than the density of the polyethylene resin; and
   wherein the polyethylene resin has a density of at least 0.938 g/cm³ to at most 0.949 g/cm³ as measured according to ASTM D-1505 at 23° C.; a melt index MI2 of at least 2.5 g/10 min to at most 25.0 g/10 min as determined according to ISO 1133, condition D, at 190° C. and under a load of 2.16 kg, and a molecular weight distribution $M_w/M_n$ of at least 2.6 to at most 3.5, with $M_w$ being the weight-average molecular weight and $M_n$ being the number-average molecular weight.

2. The metallocene-catalyzed polyethylene resin according to claim 1, wherein the Temperature Rising Elution Fractionation (TREF) distribution curve of the resin comprises at least one peak appearing at a temperature of at least 97° C. to at most 105° C. and having an area under the curve of at least 5.0% to at most 25.0%; as determined using a crystallization rate of −0.5° C./min from 95° C. to 35° C., and column load volume of 1.90 ml.

3. The metallocene-catalyzed polyethylene resin according to claim 2, wherein the Temperature Rising Elution Fractionation (TREF) distribution curve of the resin further comprises two more peaks having the following features:
   peak 1 appearing at a temperature of at least 87.0° C. to at most 93.0° C. and having an area under the curve of at least 25.0% to at most 50.0%;
   peak 2 appearing at a temperature of at least 94.0° C. to at most 98.0° C. and having an area under the curve of at least 35.0% to at most 60.0%.

4. The metallocene-catalyzed polyethylene resin according to claim 2, wherein the Temperature Rising Elution Fractionation (TREF) distribution curve has an area under the curve of at most 5.0% at a temperature of 65° C. or below.

5. The metallocene-catalyzed polyethylene resin according to claim 1, wherein the polyethylene resin has a multimodal molecular weight distribution.

6. The metallocene-catalyzed polyethylene resin according to claim 1, wherein fraction A has a density at least 0.010 g/cm³ higher than the density of the polyethylene resin.

7. The metallocene-catalyzed polyethylene resin according to claim 1, wherein polyethylene fraction A has a density as measured on the fluff of at least 0.950 g/cm³.

8. The metallocene-catalyzed polyethylene resin according to claim 1, wherein polyethylene fraction A has a melt index MI2 as measured on the fluff of at least 40.0 g/10 min to at most 100 g/10 min.

9. The metallocene-catalyzed polyethylene resin according to claim 1, comprising from 45% to at most 75% by weight of polyethylene fraction B based on the total weight of the polyethylene resin.

10. The metallocene-catalyzed polyethylene resin according to claim 1, wherein each fraction is prepared in different reactors of at least two reactors connected in series.

11. The metallocene-catalyzed polyethylene resin according to claim 1, wherein each fraction is prepared in different reactors of at least two slurry loop reactors connected in series.

12. An article comprising the metallocene-catalyzed polyethylene resin according to claim 1.

13. The article according to claim 12, wherein the article is produced by a polymer processing technique selected from the group comprising rotomolding, blow molding, injection molding, compression molding, film casting, 3D printing, extrusion, and thermoforming.

14. The article according to claim 12 wherein the article is a tank, a drum, a container, a bin, a vat, a jerrycan, a can, a cistern, a bottle, boat or parts thereof, floats, buoys, fibers, caps and closure, cast film, structural parts.

* * * * *